United States Patent
Kejik et al.

(10) Patent No.: US 9,880,025 B2
(45) Date of Patent: Jan. 30, 2018

(54) ANGULAR ORIENTATION SENSOR AND CORRESPONDING METHODS AND DEVICES

(71) Applicant: MPS TECH SWITZERLAND SARL, Gland (CH)

(72) Inventors: Pavel Kejik, Ecublens (CH); Serge Reymond, Geneva (CH)

(73) Assignee: MPS TECH SWITZERLAND SARL, Gland (CH)

( * ) Notice: Subject to any disclaimer, the term of this patent is extended or adjusted under 35 U.S.C. 154(b) by 0 days.

(21) Appl. No.: 14/902,654

(22) PCT Filed: Jul. 10, 2014

(86) PCT No.: PCT/CH2014/000101
§ 371 (c)(1),
(2) Date: Jan. 4, 2016

(87) PCT Pub. No.: WO2015/003283
PCT Pub. Date: Jan. 15, 2015

(65) Prior Publication Data
US 2016/0169706 A1    Jun. 16, 2016

(30) Foreign Application Priority Data
Jul. 11, 2013   (CH) ...................... 1246/13

(51) Int. Cl.
*G01B 7/30*    (2006.01)
*G01D 5/14*    (2006.01)
*G01D 5/20*    (2006.01)

(52) U.S. Cl.
CPC ............... *G01D 5/145* (2013.01); *G01D 5/20* (2013.01)

(58) Field of Classification Search
CPC ............ G01D 5/20; G01D 5/14; G01D 5/145; G01D 5/202; G01D 5/206; G01D 5/2225;
(Continued)

(56) References Cited

U.S. PATENT DOCUMENTS

| | | | | |
|---|---|---|---|---|
| 4,734,648 A | * | 3/1988 | Machida | ............ G01R 33/3678 324/307 |
| 7,474,976 B2 | * | 1/2009 | Schenkel | ............ G01R 33/3875 324/307 |

(Continued)

FOREIGN PATENT DOCUMENTS

| | | |
|---|---|---|
| EP | 1 039 301 | 9/2000 |
| WO | 2008/145662 | 12/2008 |

(Continued)

*Primary Examiner* — Thang Le
(74) *Attorney, Agent, or Firm* — Rankin, Hill & Clark LLP

(57) ABSTRACT

A sensor for sensing an angular orientation of a magnet producing a magnetic field includes a sensing unit having N≥2 magnetic field sensing devices MFSD; a scanning circuit for repeatedly sequentially probing at least two of the MFSDs and concatenating signals outputted by the respective MFSDs for obtaining a magnetic signal; a magnet-signal output for outputting the magnetic signal; and a reference output for outputting a reference signal independent of the magnetic field. The sensor includes a first signal processing unit SPU1 and a second signal processing unit which are identically constructed, each having an input and an output; a phase detection unit PDU having a first input PDU1 and a second input PDU2, for deriving phase differences between inputted signals, and for outputting a signal related to the angular orientation.

18 Claims, 4 Drawing Sheets

(58) Field of Classification Search
CPC ........ G01D 5/2208; G01B 7/003; G01B 7/30;
G01B 11/26; G01B 13/18; G01B 21/22;
H02K 11/31; H02K 11/15; H02K 29/12;
H02K 29/06; G01L 3/105; G01L 1/127
USPC ........ 324/207.2–207.25, 252, 259, 206, 174,
324/179
See application file for complete search history.

(56) References Cited

U.S. PATENT DOCUMENTS

| | | | |
|---|---|---|---|
| 8,933,692 B2 * | 1/2015 | Ueda | G01D 5/2448 324/207.22 |
| 2006/0136169 A1 * | 6/2006 | Shonai | G01D 3/022 702/145 |
| 2008/0074102 A1 | 3/2008 | Kitanaka et al. | |
| 2015/0008907 A1 * | 1/2015 | Janisch | G01D 5/145 324/207.25 |

FOREIGN PATENT DOCUMENTS

| | | |
|---|---|---|
| WO | 2009/124969 | 10/2009 |
| WO | 2012/151707 | 11/2012 |

* cited by examiner

ANGULAR ORIENTATION SENSOR AND CORRESPONDING METHODS AND DEVICES

BACKGROUND OF THE INVENTION

Field of the Invention

The invention relates to the field of sensing the angular orientation of a magnetic field. In particular, the invention relates to a sensor for sensing an angular orientation of a magnet producing a magnetic field, and this way, also rotational speeds or related magnitudes can be derived. Corresponding devices find application in many areas, e.g., in position sensing and in rotation speed measuring, e.g., in electric motors and in automotive and aircraft industry.

Description of Related Art

In WO 2008/145662 A1, a magnetic field sensor for measuring a direction of a magnetic field in a plane is presented, which includes a sensing structure including a ring-shaped well, a plurality of contacts of equal size placed at equal distance from each other along the ring-shaped well, and an electronic circuit including a plurality of electronic switches associated with the contacts of the sensing structure, a logic block for controlling the electronic switches, at least one current source, a means for measuring a difference between a first voltage and a second voltage, a timing circuit providing a control signal for controlling the logic block and providing a reference signal. The logic block is adapted to close and open the electronic switches under the control of the control signal according to a predetermined scheme such that a predetermined number of contacts of the plurality of contacts form a vertical Hall element that is supplied with current from the at least one current source and that has two contacts connected to the means for measuring, and such that the vertical Hall element is moved in steps along the ring-shaped well. Also provided is a means for measuring a phase shift between the reference signal and an output signal of the voltage measuring means.

From WO 2009/124969 A1, a magnetic field sensor for measuring a direction of a magnetic field in a plane is known which includes two sensing structures that can be operated as a rotating Hall element. The two Hall elements are rotated in discrete steps in opposite directions. Such a magnetic field sensor can be used as current sensor for measuring a primary current flowing through a conductor.

WO 2012/151707 discloses a method for sensing an angular orientation of a magnetic field including:
a) providing a set of N≥2 Hall effect devices, each having a detection direction and including two pairs of connectors;
b) providing at least one band pass filter having a fundamental frequency $f=1/T_f$;
c) providing at least one current source for outputting an electrical current at its output; wherein a particular way of wiring both pairs of connectors of a Hall effect device to the output of the current source or to the band pass filter is referred to as a "wiring scheme";
d1) applying, during a first time period of a duration $0.5\ T_f$ and in a specific sequence of the N Hall effect devices, to each of the N Hall effect devices a respective wiring scheme Wi+, during respective subsequent time periods of durations ti; and
d2) applying, during a second time period of a duration $0.5\ T_f$, subsequent to the first time period of a duration $0.5\ T_f$, and in the same specific sequence of the N Hall effect devices, to each of the N Hall effect devices a respective wiring scheme Wi−, during respective subsequent time periods of the same durations ti;
wherein each of the wiring schemes Wi+ is an orthogonal and reverse wiring scheme of the respective other wiring scheme Wi−; and
e) deriving from signals outputted by the band pass filter in reaction to carrying out steps d1) and d2) an output signal indicative of the angular orientation;
wherein $i=1, \ldots, N$.

SUMMARY OF THE INVENTION

One object of the invention is to create an improved way of sensing an angular orientation of a magnet producing a magnetic field. More specifically, an improved method for sensing an angular orientation of a magnet producing a magnetic field shall be provided and a corresponding sensor for sensing an angular orientation of a magnet producing a magnetic field as well as an integrated circuit including such a sensor shall be provided. Furthermore, a device or arrangement including such a sensor shall be provided as well as a method for manufacturing a sensor for sensing an angular orientation of a magnet producing a magnetic field, and a use of a signal processing unit in a sensor for sensing an angular orientation of a magnet producing a magnetic field.

Another object of the invention is to create a way of sensing an angular orientation of a magnet producing a magnetic field that produces particularly stable results.

Another object of the invention is to provide a way of determining such an angular orientation, which is particularly insensitive to undesired phase drift.

Another object of the invention is to provide a way of determining such an angular orientation, which is particularly insensitive to undesired external influences.

Another object of the invention is to provide a way of determining such an angular orientation, which is particularly insensitive to undesired internal influences.

Another object of the invention is to provide a way of determining such an angular orientation, which makes possible to unambiguously determine an angle representative of the angular orientation. In other words, the angular orientation shall be determinable such that any angle between 0° and 360° can be univocally (uniquely) determined.

Another object of the invention is to provide a way of determining such an angular orientation, which is implemented relatively easily.

Another object of the invention is to provide a way of determining such an angular orientation, which yields particularly accurate results.

Another object of the invention is to provide a particularly fast way of determining such an angular orientation.

Another object of the invention is to provide a sensor having a good manufacturability.

Another object of the invention is to provide an improved rotary encoder.

Another object of the invention is to create an improved way of processing signals used in sensing an angular orientation of a magnet producing a magnetic field.

Another object of the invention is to carry out signal processing in a sensor for sensing an angular orientation of a magnet producing a magnetic field in such a way that the sensor produces a particularly stable output.

Further objects emerge from the description and embodiments below.

The sensor for sensing an angular orientation of a magnet producing a magnetic field includes a sensing unit including
  N≥2 magnetic field sensing devices;
  a scanning circuit for (more particularly structured and arranged for) repeatedly, at a frequency f0, sequentially probing in a first preset order at least two of the N magnetic field sensing devices and concatenating signals outputted by the respective probed (or "scanned") magnetic field sensing devices in reaction to the magnetic field for obtaining an analog signal referred to as first raw magnetic signal which is a signal including a frequency component of the frequency f0;

at least a first magnet-signal output for outputting the first raw magnetic signal; and a reference output for outputting a reference signal, which is a logic signal of the frequency f0, which is independent of the magnetic field.

The sensor furthermore includes:

a first signal processing unit and a second signal processing unit, which are identically constructed, each having an input and an output;

a phase detection unit having at least a first and a second input, for deriving phase differences between signals inputted to the phase detection unit, and for obtaining in dependence of the phase differences, and for outputting a signal referred to as output angle signal representative of an angle related to the angular orientation, the phase detection unit including at least a first unambiguous phase detecting circuit having two inputs being identical to the first and second input, respectively;

wherein

C1) the input of the first signal processing unit is coupled to the first magnet-signal output;

C2) the output of the first signal processing unit is coupled to the first input of the phase detection unit;

C3) the reference output is coupled to the second input of the phase detection unit;

C4) the input of the second signal processing unit is coupled to an output of the sensing unit;

C5) the output of the second signal processing unit is coupled to an input of the phase detection unit.

This way, a sensor for unambiguously sensing full 360° field orientation may be constructed which, in addition, provides a very stable output (i.e. the output angle signal is very insensitive to undesired influences then). More particularly, two signals may be obtained, which experience phase deviations (undesired phase deviations) possibly occurring in the first and the second signal processing unit, respectively, while nevertheless, unambiguous results may be obtained due to using the reference signal. Due to the similarity of the first and second signal processing units (identical construction), these (undesired) phase deviations are (at least to a very great extent) equal for the first and second signal processing units.

Forming a difference, in particular a phase difference, based on these signals makes it possible to cancel the phase deviations. Having eliminated the phase deviations, a much more stable sensor output signal can be obtained, practically or at least largely independent of external influences, such as temperature variations, to which the first and second signal processing units are subjected and of internal effects such as frequency-dependent or current-dependent effects.

Forming the difference may be accomplished in different ways. A phase difference of the before-mentioned signals themselves may be obtained, namely by means of the first unambiguous phase detecting circuit. Alternatively, each of the two signals is fed to a different one of two unambiguous phase detecting circuits of the phase detection unit (each together with another signal), and then, the difference is formed from the so-obtained phase-difference signals, which may in particular be digital signals, in which case, digital adding or subtraction can be used.

Alternatively to forming a difference, or in addition thereto, it is also possible to determine the phase deviation using a second unambiguous phase detecting circuit of the phase detection unit, and to use the so-obtained signal as a control signal in a closed-loop control. More particularly, the signal may be used for controlling the frequency of a clock generator from which also the frequency f0 for the first raw magnetic signal and for the reference signal is derived.

Note that the wording "signals outputted by the respective probed magnetic field sensing devices: in reaction to "the magnetic field" may be understood as "signals outputted by the respective probed magnetic field sensing devices" as a result of an interaction of the respective probed magnetic field sensing device with "the magnetic field".

The first raw magnetic signal may more specifically be a periodic signal of the frequency f0—at least provided that the magnetic field remains unchanged. Typically, raw magnetic signals (first or second, cf. below) are staircase signals. And typically, the staircase signal is an approximation to a sine-shaped signal (at least provided that the magnetic field remains unchanged during the time of probing).

Note that couplings such as some of the couplings C1 to C5 above may be, at least partially, identical. For example, in some embodiments, couplings C3 and C4 may partially coincide, such as coupling C4 constituting a part of coupling C3.

Note also that a coupling (in general) does not need to be direct, but can be accomplished via one or more units. For example, in some embodiments, coupling C3 and/or coupling C4 may be an indirect coupling, e.g., via an attenuator.

Accordingly, depending on the embodiment, the reference output may be coupled directly or indirectly to the second input of the phase detection unit. An indirect coupling may in particular be accomplished via the second signal processing unit, cf. below.

The signal processing units may in particular be structured and arranged for obtaining a logic signal from an inputted analog signal and, more particularly for obtaining from an inputted periodic analog signal (such as the first raw magnetic signal or the reference signal) a logic signal having one edge per zero-crossing of the inputted periodic analog signal.

An unambiguous phase detecting circuit is structured and arranged for univocally (uniquely, unambiguously) determining a phase difference of two inputted signals, i.e. phase differences in the full range of 0° to 360° are distinguishable, i.e. can be uniquely identified. Therefore, the two inputs of an unambiguous phase detecting circuit are not equivalent, i.e. interchanging inputted signals usually results in a different detected phase difference, namely the negative of the otherwise detected phase difference.

Usually, logic signals are inputted to as unambiguous phase detecting circuit.

A logic signal may be defined, e.g., as a signal (or a waveform), which may assume two discrete values only. More particularly, a voltage of a logic signal is either equal to the logic level 1 or to the logic level zero.

In one embodiment,
the phase detection unit includes a third and a fourth input;
the phase detection unit includes a second unambiguous phase detecting circuit having two inputs being identical to the third and fourth input, respectively;
the output of the second signal processing unit is coupled to the third input of the phase detection unit.

The first and second unambiguous phase detecting circuits may be identically constructed or may be differently constructed.

Having a second unambiguous phase detecting circuit provides the possibility to obtain two (usually different) phase differences, one by means of the first unambiguous phase detecting circuit and the other by means of the second unambiguous phase detecting circuit. This makes possible to compensate for undesired effects or drifts, more particularly for the phase deviations, and thus to obtain an output angle signal which is highly stable. In particular, one of these phase differences can be used for establishing a correction to the other. Various ways of doing so are possible.

In particular, this may, e.g., be accomplished by forming the sum or difference between the two phase differences. In such a case, it can be advisable to provide that the first and second unambiguous phase detecting circuits are identically constructed.

In one embodiment referring to the last-mentioned embodiment, the phase detection unit includes an adder or subtractor having a first input and a second input, the first and second unambiguous phase detecting circuits each having an output for outputting a phase difference signal representative of a phase difference between signals inputted to the two inputs of the respective unambiguous phase detecting circuit, wherein an output of the first unambiguous phase detecting circuit is coupled to the first input of the digital adder or subtractor; and an output of the second unambiguous phase detecting circuit is coupled to the second input of the digital adder or subtractor.

The phase difference signal may, in particular, be a digital signal.

The adder or subtractor may, in particular, be a digital adder or subtractor.

Thus, it may be provided for having the output of the first signal processing unit coupled (in particular, directly coupled) to an input of the first unambiguous phase detecting circuit (more particularly to the first input) and having the output of the second signal processing unit coupled (in particular, directly coupled) to an input of the second unambiguous phase detecting circuit (more particularly to the third input). The further interconnections have to be selected accordingly, wherein various possibilities exist. Note that unambiguous phase detecting circuits generally output different phase difference signals when connections to their inputs are interchanged. More precisely, the sign of the output changes when the connections to their inputs are interchanged. Therefore, and since one can interconnect one or more inverters (i.e., for digital signals, a component for changing the sign) between one of the unambiguous phase detecting circuits (or both) on the one side and the adder or subtractor on the other side, one may select either an adder or a subtractor, and one may select from numerous ways of providing interconnections, and one may provide no inverter or one or more inverters in order to obtain the desired output angle signal.

The sum or difference may be formed, e.g., either from two phase difference signals, which are expected to be identical and therefore nominally identical (possibly except for the sign) except for that the first phase difference signal has been subjected to the undesired effects in an inverse way compared to the second phase difference signal, or from a phase difference signal, which was subjected to the undesired effects and another phase difference signal, which is representative of the undesired effect itself (possibly except for the sign).

The output of the adder or subtractor usually is an output of the phase detection unit. In particular, the sum or difference obtained by the adder or subtractor may be the output angle signal.

In one embodiment referring to the last-mentioned embodiment,

I) the reference output; or

II) the output of the first signal processing unit;

is coupled to the fourth input of the phase detection unit and to the input of the second signal processing unit.

And in particular, it may be provided that the input of the second signal processing unit is coupled, in case I), to the reference output; and in case II), to the output of the first signal processing unit; via an attenuator.

In case I), the second unambiguous phase detecting circuit may in particular be fed (via the fourth input of the phase detection unit) directly with the reference signal and (via the third input of the phase detection unit) with a signal based on the reference signal, but which has been processed in the second signal processing unit. Usually, it will be provided that the reference signal is attenuated in an attenuator before the (then attenuated) signal reaches the second signal processing unit.

In particular, it may be provided that in case I), the first unambiguous phase detecting circuit determines the phase difference between the reference signal and the signal obtained by processing the first raw magnetic signal in the first signal processing unit. We shall refer to the signal obtained by processing the first raw magnetic signal in the first signal processing unit, i.e. the signal outputted from the first signal processing unit (when being fed with the first raw magnetic signal), as "first processed magnetic signal". Accordingly, the phase difference signal outputted by the first unambiguous phase detecting circuit is representative of the desired signal (possibly except for the sign) superimposed by the phase deviations occurring unavoidably, in particular occurring unavoidably in and due to the first signal processing unit. And the second unambiguous phase detecting circuit determines the phase difference between the reference signal and the signal obtained by processing the reference signal in the second signal processing unit. Accordingly, the phase difference signal outputted by the second unambiguous phase detecting circuit is representative of the phase deviations which unavoidably occur, in particular which occur in and due to the second signal processing unit. Suitably forming the sum or difference of the phase difference signals outputted by the first and outputted by the second unambiguous phase detecting circuit will result in a cancellation of the (undesired) phase deviations (since the first and second signal processing units are identically constructed) and thus allow to have an output angle signal that is, at least to a great extent, independent of the phase deviations and thus very stable and precise. The output angle signal in this case is usually representative of the sought angular orientation (signs neglected).

In case II), the second unambiguous phase detecting circuit may, in particular, be fed (via the fourth input of the phase detection unit) directly with the signal outputted from the first signal processing unit (i.e. with the first processed magnetic signal) and (via the third input of the phase detection unit) with a signal based on the first processed magnetic signal, but which has been processed in the second signal processing unit. Usually, it will be provided that the first processed magnetic signal is attenuated in an attenuator before the (then attenuated) signal reaches the second signal processing unit.

In particular, it may be provided that in case II), the first unambiguous phase detecting circuit determines the phase difference between the reference signal and the first processed magnetic signal. Accordingly, the phase difference signal outputted by the first unambiguous phase detecting circuit is representative of the desired signal (possibly except for the sign) superimposed by the phase deviations occurring unavoidably (in particular occuring unavoidably in and due to the first signal processing unit). And the second unambiguous phase detecting circuit determines the phase difference between the first processed magnetic signal and the signal obtained by processing the first processed magnetic signal in the second signal processing unit. Accordingly, the phase difference signal outputted by the second unambiguous phase detecting circuit is representative of the phase deviations occurring unavoidably, in particular occurring unavoidably in and due to the second signal processing unit. Suitably forming the sum or difference of the phase difference signals outputted by the first and outputted by the second unambiguous phase detecting circuit will result in a cancellation of the (undesired) phase deviations (since the first and second signal processing units are identically constructed) and thus allow to have an output angle signal which is, at least to a great extent, independent of the phase deviations and thus very stable and precise. The output angle signal in this case is usually representative of the sought angular orientation (signs neglected).

As has been announced above, the sum or difference of phase difference signals may also be formed from two phase difference signals which are nominally identical (possibly except for the sign) except for that the first phase difference signal has been subjected to the undesired effects inversely with respect to how the second phase difference has been subjected to the undesired effects. Practically equivalently, one could say that the sum or difference of phase difference signals may also be formed from two phase difference signals that are nominally inverse (possibly except for the sign), wherein, however, the first phase difference signal has been subjected to the undesired effects in the same way (with the same sign) as the second phase difference signal has been subjected to the undesired effects.

This can be realized by providing two raw magnetic signals, namely a second raw magnetic signal in addition to the first raw magnetic signal. Creating these first and second raw magnetic signals in such a way that they are (expected to be and thus nominally) complementary to each other and having the first one processed in the first signal processing unit and the second one processed in the second signal processing unit makes possible to cancel out the phase deviations (in particular those occurring in and due to the signal processing units) by suitably forming a difference from them (or a sum, depending on wiring and possibly present inverters; cf. above). Therein, the two raw magnetic signals being mutually complementary means that the phase of the one signal is 360° minus the phase of the other signal, i.e. it means that the two signals have mutually reversed phases. Producing two such mutually phase-reversed signals may be accomplished, e.g., by providing two mutually reversed orders for the probing of one and the same set of magnetic field sensing devices.

In one embodiment referring to the before-last mentioned embodiment, the scanning circuit is furthermore structured and configured for repeatedly, at the frequency f0, sequentially probing in a second preset order at least two of the N magnetic field sensing devices and concatenating signals outputted by the respective probed magnetic field sensing devices in reaction to the magnetic field for obtaining an analog signal referred to as second raw magnetic signal, which is a signal including a frequency component of the frequency f0, and wherein the sensing unit includes a second magnet-signal output for outputting the second raw magnetic signal, and wherein C1') the second magnet-signal output is coupled to the input of the second signal processing unit; and C3') the reference output is coupled to the fourth input of the phase detection unit.

This way, the sensor can be very symmetric. However, the scanning circuit may have to be more complicated than in other embodiments.

In such an embodiment, the second unambiguous phase detecting circuit may in particular be fed (via the fourth input of the phase detection unit) directly with the reference signal and (via the third input of the phase detection unit) with a signal obtained by processing the second raw magnetic signal in the second signal processing unit. We shall refer to the signal obtained by processing the second raw magnetic signal in the second signal processing unit, i.e. the signal outputted from the second signal processing unit (when being fed with the second raw magnetic signal), as "second processed magnetic signal".

Merely as a repetition, a coupling (such as C1'), C3')) may be direct, but may, on the other hand, also be accomplished via one or more units.

In particular, it may be provided that in such an embodiment, the first unambiguous phase detecting circuit determines the phase difference between the reference signal and the first processed magnetic signal. Accordingly, the phase difference signal outputted by the first unambiguous phase detecting circuit is representative of the desired signal (possibly except for the sign) superimposed by the phase deviations occurring unavoidably, in particular occurring unavoidably in and due to the first signal processing unit. And the second unambiguous phase detecting circuit determines the phase difference between the reference signal and the second processed magnetic signal. Accordingly, the phase difference signal outputted by the second unambiguous phase detecting circuit is representative of the desired signal (possibly except for the sign) superimposed by the phase deviations occurring unavoidably, in particular occurring unavoidably in and due to the first signal processing unit, wherein the contribution of the signals outputted by the first and second unambiguous phase detecting circuits originating from the raw magnetic signals (and thus from the magnetic field sensing devices and thus from the magnetic field), are mutually inverted, whereas the contributions of the (undesired) phase deviations are substantially identical; or vice versa (depending on the wiring and on possible present inverters): Magnetic-field dependent contributions are substantially identical whereas the contributions of the phase deviations are mutually inverted. Suitably forming the sum or difference of the phase difference signals outputted by the first and outputted by the second unambiguous phase detecting circuit will result in a cancellation of the (undesired) phase deviations (since the first and second signal processing units are identically constructed) and thus allow to have an output angle signal which is at least to a great extent independent of the phase deviations and thus very stable and precise. The output angle signal in this case is usually representative of twice the sought angular orientation (signs neglected).

The second raw magnetic signal may more specifically be a periodic signal of the frequency f0—at least provided that the magnetic field remains unchanged.

The at least two of the N magnetic field sensing devices which are probed in the second preset order may be identical with or different from those at least two of the N magnetic field sensing devices which are probed in the first preset order, or a portion of them is identical and another portion is different.

It can be provided that the first and second preset order are mutually different. However, the first and second preset orders may be identical—in particular in the case with only two magnetic field sensing devices (N=2). In case the magnetic field sensing devices probed in the first preset order and the magnetic field sensing devices probed in the second preset order are different, it may even be not meaningful to state the preset orders are equal or identical.

The probing in the first preset order usually takes place simultaneously with the probing in the second preset order.

In general, usually, each of the magnetic field sensing devices has a detection direction. And generally, the detection directions usually define a sensing plane of the sensing unit.

In another possible configuration, it may be provided that different vectorial components of the magnetic field in the sensing plane of the sensing unit are probed by the probing of the at least two of the N magnetic field sensing devices. In that case, it may in particular be provided that the probed magnetic field components describe, in case of the first preset order (and thus in case of the first raw magnetic signal), a rotation about an axis perpendicular to the sensing plane in a first sense, whereas the probed magnetic field components describe, in case of the second preset order (and thus in case of the second raw magnetic signal), a rotation about the axis in a second sense, wherein the first and second senses are mutually opposite.

In this configuration, the at least two detection directions of the respective magnetic field sensing devices usually lie in one common plane; and that common plane is the sensing plane of the sensing unit in this case.

It may in particular be provided that one component of the magnetic field is probed in different locations in space (i.e., in different spatial positions) by the probing of the at least two of the N magnetic field sensing devices. In that case, it may in particular be provided that the locations where the magnetic field component is probed describe, in case of the first preset order (and thus in case of the first raw magnetic signal), a rotation about an axis perpendicular to the sensing plane in a first sense, whereas the probed magnetic field components describe, in case of the second preset order (and thus in case of the second raw magnetic signal), a rotation about the axis in a second sense, wherein the first and second senses are mutually opposite.

In this case, the respective detection directions of the magnetic field sensing devices are usually aligned along an axis (a common axis), and the sensing plane is the plane perpendicular to that axis.

As has been indicated above, there is another way of using one of the phase differences (outputted by one of the unambiguous phase detecting circuits) for establishing a correction to the other phase differences (outputted by the other unambiguous phase detecting circuit). Alternatively to forming a difference of the phase differences, or in addition thereto, it is also possible to determine the (undesired) phase deviations using a second unambiguous phase detecting circuit of the phase detection unit, and to use the so-obtained signal as a control signal in a closed-loop control. More particularly, the signal may be used for controlling the frequency of a clock generator from which also the frequency f0 for the first raw magnetic signal and for the reference signal are derived.

In one embodiment referring to the first-mentioned embodiment (introducing the second unambiguous phase detecting circuit), the sensing unit includes an input for receiving a clock signal, and the phase detection circuit includes an integrating unit for producing and outputting at its output a signal referred to as control signal suitable for controlling a frequency of a clock signal of a clock generator. The integrating unit includes an integrator, and an output of the second unambiguous phase detecting circuit is coupled to an input of the integrating unit.

The sensing unit usually is structured for deriving the reference signal from the clock signal, e.g., by frequency dividing. In particular, a frequency fc of the clock ("clock frequency") can be $2^n$ times f0, with n being an integer between 2 and 32, more typically between 4 and 16. At least, fc and f0 are usually proportional to each other.

The control signal can be used for controlling, in particular in a closed-loop fashion, the frequency of a clock signal, and the frequency f0 (which governs the probing of the magnetic field sensing devices) can be derived from the clock signal, such that, finally, frequency f0 can be controlled.

The clock generator is provided for generating a clock signal of clock frequency fc. The clock signal is a periodic logic signal, typically with one rising and one falling edge per cycle.

A logic signal may be defined, e.g., as a signal (or a waveform) that may assume two discrete values only. More particularly, a voltage of a logic signal is either equal to the logic level 1 or to the logic level zero.

Phase deviations originating from a signal processing unit usually exhibit a frequency dependence. This is particularly evident and pronounced in case the signal processing unit includes a filter; but, e.g., also any usual amplifier already shows a frequency dependence. Such a frequency dependence can be made use of in order to keep constant the (undesired) phase deviations effected by the first signal processing unit. One can say that the clock frequency fc can be used for controlling the phase deviations. More particularly, time-variations of the phase deviations can be strongly reduced or compensated for by suitably selecting the clock frequency. And this can be accomplished by feeding the output of the second unambiguous phase detecting circuit (via the integrating unit) to a control input of the clock generator. Varying fc results in varying f0 resulting in varying the (undesired) phase deviations. And in a closed-loop control, a signal related to the phase deviations can be used for controlling fc and thus for keeping the phase deviations constant—which results in stable output angle signals.

The integrator (or the integrating unit) makes possible to insert a time constant (into the control loop), which can be useful because effects provoking the (undesired) phase deviations are usually much slower than 1/f0. The integrating unit can in particular be provided for receiving a signal (in particular a digital signal) and outputting a signal (in particular an analog signal) corresponding to an integral over a time period of the inputted signal. The time period of the integrator (or of the integrating unit) is a matter of design. Usually, it is at least 5 times, in particular at least 10 times or rather at least 50 times 1/f0.

The outputted signal (control signal) can in particular be an analog signal, in particular in case the clock generator is a voltage-controlled oscillator (VCO); but it could also be provided that it is a digital signal. The integrator can in particular be a digital integrator, in particular provided that the phase difference signals outputted by the second unambiguous phase detecting circuit are digital signals. In case the signal outputted by the integrator is a digital signal, the integrating unit may include a digital-to-analog converter for obtaining an analog output signal of the integrating unit.

It is readily understood that between the input of the integrating unit and the input of the integrator and/or between the output of the integrating unit and the output of the integrator, a digital-to analog converter or an analog-to-digital converter may be provided, if so desired.

It is to be noted that the clock generator may be provided separate from the sensor, i.e. be a clock generator external to the sensor. However, it can be provided that the sensor itself includes a clock generator.

And the clock generator may, e.g., be a voltage-controlled oscillator.

In one embodiment referring to the last-mentioned embodiment, the sensor includes a clock generator for generating and outputting at its output a clock signal of a frequency fc, the clock generator having a control input for setting the frequency fc, the input of the sensing unit being coupled to the output of the clock generator, and wherein the output of the integrating unit is coupled to the control input of the clock generator.

A clock generator internal to the sensor may, in particular, be realized in one and the same semiconductor chip in which one or more further constituents of the sensor are realized. In particular, the whole sensor (including the clock generator) may be realized in a single chip (e.g., silicon chip), in particular using CMOS processes.

In one embodiment referring to one or both of the two last-mentioned embodiments,
i) the reference output; or
ii) the output of the first signal processing unit;
is coupled to the fourth input of the phase detection unit and to the input of the second signal processing unit.

And in particular, it may be provided that the input of the second signal processing unit is coupled,
in case i), to the reference output; and
in case ii), to the output of the first signal processing unit;
via an attenuator.

In both cases, the second unambiguous phase detecting circuit together with the integrating unit can produce a signal related to the (undesired) phase deviations, which can be used for selecting (or adjusting) frequency fc.

A cancellation of (undesired) phase deviations induced by the first signal processing unit may also be accomplished in a particularly simple way. This way may be contemplated by amending the wiring to the inputs of the two unambiguous phase detecting circuits in an embodiment such as the one of "case I)", cf. above. Re-wiring can render one of the two unambiguous phase detecting circuits superfluous because the same signal would be present at both inputs of the respective (usually second) unambiguous phase detecting circuit.

Thus, in a corresponding embodiment,
the reference output is coupled to the input of the second signal processing unit; and
the output of the second signal processing unit is coupled to the second input of the phase detection unit.

Usually, it will be provided that the reference signal is attenuated in an attenuator before the (then attenuated) signal reaches the second signal processing unit. This way, in the second signal processing unit, the (possibly attenuated) reference signal is subjected to phase deviations. Due to the identical construction of the first and second signal processing units, the phase deviations to which the (possibly attenuated) reference signal is subjected are at least approximately the same as those to which the first raw magnetic signal is subjected. Accordingly, both these phase deviations will at least approximately cancel each other in the phase detection unit (more precisely in the first unambiguous phase detecting circuit), such that an output angle signal will be obtained, which is at least to a great extent independent of the phase deviations, and thus very stable and precise. The output angle signal in this case is usually representative of the sought angular orientation (sign neglected).

The phase detection circuit may in this case substantially consist of the first unambiguous phase detecting circuit.

In one embodiment, which may be combined with one or more of the before-mentioned embodiments, the first signal processing unit includes at least one of a filter, an amplifier, a comparator.

In particular, the first signal processing unit includes an amplifier, a filter and a comparator. More particularly, the first signal processing unit substantially consists of an amplifier, a filter, and a comparator.

The amplifier usually is provided for amplifying the usually weak raw magnetic signals.

The filter which, more generally, may also be considered a filtering-or-resonating unit usually is provided for obtaining an at least approximately sine-shaped signal from a stair-case shaped signal. It may in particular be a bandpass filter, the center frequency of the bandpass filter usually is in the range f0 plus-minus 20% or rather in the range f0 plus-minus 10%. A signal processing unit including a filter can be particularly susceptible to producing considerable phase deviations. And a signal processing unit for use with the described scanning circuit usually strongly benefits from a filtering-or-resonating unit in the signal processing unit.

The comparator makes possible in a very simple way to obtain a logic signal from an inputted analog signal. Alternatively, also another component capable of transforming an analog signal into a logic signal may be used.

Due to the identical construction of the first and second signal processing units, the same applies to the second signal processing unit as well.

In one embodiment, which may be combined with one or more of the before-mentioned embodiments, the probing at least two of the N magnetic field sensing devices in the first preset order is carried out such that repeatedly,
X) different vectorial components of the magnetic field in the sensing plane are probed; or
Y) in different locations in the sensing plane, the respective vectorial component of the magnetic field perpendicular to the sensing plane is probed.

The same may also apply for the probing in the second preset order.

Referring to case of X), the different vectorial components are usually those components that are parallel to the detection direction of the respective magnetic field sensing device.

Referring to case of Y), the different locations are usually those locations at which the respective magnetic field sensing device is located.

In one embodiment, which may be combined with one or more of the before-mentioned embodiments, the magnetic field sensing devices are Hall effect devices. In case of Hall effect devices, each magnetic field sensing device (i.e. each Hall effect device) includes a first and a second pair of connectors, and in presence of the magnetic field, a flow of an electric current ("bias current") between the connectors of the first pair makes possible to pick up a Hall voltage between the connectors of the second pair induced by the magnetic field, unless a magnetic field component of the magnetic field along the detection direction of the magnetic field sensing device (Hall effect device) is zero.

In one embodiment, which may be combined with one or more of the before-mentioned embodiments except for the last-mentioned one, the magnetic field sensing devices are magnetoresistance effect devices (MR devices). In particular, they may be giant magnetoresistance effect devices (GMR devices) or anisotropic magnetoresistance effect devices (AMR devices).

In one embodiment, which may be combined with one or more of the before-mentioned embodiments, the sensing unit is structured for applying bias signals to the magnetic field sensing devices during the sequentially probing the magnetic field sensing devices, wherein for each probed magnetic field sensing device, the applied bias signal is constant during probing the respective magnetic field sensing device.

The bias signals may in particular be bias currents.

Accordingly, current pulses of rectangular shape may be provided as bias signals for biasing the magnetic field sensing devices in order to allow the magnetic field sensing devices to produce a signal depending on the present magnetic field. The raw magnetic signals (first or, if applicable, second) can be understood as being a sequence of so-produced signals depending on the present magnetic field.

The clock signal usually provides a basis for probing (or scanning) the N magnetic field sensing devices. Usually, the sensing unit includes a frequency divider, the frequency of the clock signal usually being an integer multiple of frequency f0, e.g., a $2^n$ fold thereof, e.g., n=4 or 8 or 10 or 12, n typically indicating the bit resolution of the output angle signal.

Generally, the clock signal is also fed to the phase detection unit, more particularly to the first unambiguous phase detecting circuit, and usually to each unambiguous phase detecting circuit comprised in the phase detection unit.

In one embodiment, which may be combined with one or more of the before-addressed embodiments, each of the unambiguous phase detecting circuits includes and, more particularly, substantially consists of, a of a latch and a counter. This is a very simple way of implementing an unambiguous phase detecting circuit, in particular an unambiguous phase detecting circuit outputting a digital signal. And, in addition, such an unambiguous phase detecting circuit responds very fast to inputted signals (processed magnetic signals). In particular, the latch is a set-reset latch (SR latch).

The output angle signals are outputted by the phase detection unit usually are proportional to an angle indicative (or representative) of the angular orientation, or at least are related thereto via a linear function, and they are in particular not proportional to a trigonometric function of the angle such as a tangent of the angle.

As to possible details concerning the design and construction of a sensing unit, it is referred to prior art. Suitable possibilities are described in detail, e.g., in the above-mentioned WO 2008/145662 A1 and WO 2012/151707 A1 and also in the Swiss patent filing with reference number 1636/12 filed on Sep. 7, 2012. Therefore, these patent applications are incorporated by reference in the present patent application.

The first (and also the second) raw magnetic signal is an analog signal including a frequency component of frequency f0, wherein the frequency component of frequency f0 has a phase proportional to an angle representing the angular orientation (at least when undesired phase deviations are disregarded).

The integrated circuit including a sensor according to the invention.

It is possible to manufacture the complete sensor in one piece of semiconductor material, e.g., of silicon. In particular, the sensor may be manufactured in CMOS technology and using CMOS processes, respectively.

Features of the integrated circuit correspond to features of corresponding sensors, and vice versa. Also the respective effects and advantages correspond to each other.

The device or arrangement includes a sensor according to the invention or an integrated circuit according to the invention.

In one embodiment, the device or arrangement is at least one of an angular position sensor;
  a rotary encoder;
  a rotation speed sensor;
  a revolution counter;
  an electric motor.

Features of the device or arrangement correspond to features of corresponding sensors, and vice versa. Also the respective effects and advantages correspond to each other.

The method for sensing an angular orientation of a magnet producing a magnetic field includes the steps of:
a) providing a sensing unit including N≥2 magnetic field sensing devices;
b) repeatedly, at a frequency f0, sequentially probing in a first preset order at least two of the N magnetic field sensing devices;
c) concatenating signals outputted by the respective probed magnetic field sensing devices in reaction to the magnetic field for obtaining an analog signal referred to as first raw magnetic signal, which is a signal including a frequency component of the frequency f0;
d) outputting the first raw magnetic signal; and
e) outputting a reference signal, which is a logic signal of the frequency f0, which is independent of the magnetic field;
f) providing a first signal processing unit and a second signal processing unit, which are identically constructed, each having an input and an output;
g) providing a phase detection unit having at least a first and a second input, for deriving phase differences between signals inputted to the phase detection unit and for obtaining in dependence of the phase differences and for outputting a signal referred to as output angle signal representative of an angle related to the angular orientation, the phase detection unit including at least a first unambiguous phase detecting circuit having two inputs being identical to the first and second input, respectively;

the method further including the steps of:
m) processing the first magnetic signals in the first signal processing unit for obtaining signal referred to as first processed magnetic signals;
n) feeding the first processed magnetic signals to the first input of the phase detection unit;
o) providing an interconnection between the reference output and the second input of the phase detection unit;
p) providing an interconnection between the input of the second signal processing unit and an output of the sensing unit;

q) providing an interconnection between the output of the second signal processing unit and an input of the phase detection unit.

Features of the sensing method correspond to features of corresponding sensors, and vice versa. Also the respective effects and advantages correspond to each other.

For example, any of the interconnections mentioned in steps o), p), q) may be direct or indirect, and some of them may constitute a portion of another.

The method (and, correspondingly also the sensor) can find various applications and may thus be used for various purposes, e.g., for at least one of
- determining an angular position of a rotatable body including the magnet;
- determining a rotational speed of a rotating body including the magnet;
- determining a change in rotational speed of a rotating body including the magnet;
- determining a number of revolutions of a rotatable body that have taken place from an initial point in time.

The method for manufacturing a sensor for sensing an angular orientation of a magnet producing a magnetic field includes manufacturing in a single piece of semiconductor material a sensing unit including:
- N≥2 magnetic field sensing devices;
- a scanning circuit for (more particularly structured and arranged for) repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal, which is a signal including a frequency component of the frequency f0;
- at least a first magnet-signal output for outputting the first raw magnetic signal; and
- a reference output for outputting a reference signal, which is a logic signal of the frequency f0, which is independent of the magnetic field;

the sensor furthermore comprising:
- a first signal processing unit and a second signal processing unit, which are identically constructed, each having an input and an output;
- a phase detection unit having at least a first and a second input, for deriving phase differences between signals inputted to the phase detection unit and for obtaining in dependence of the phase differences and for outputting a signal referred to as output angle signal representative of an angle related to the angular orientation, the phase detection unit including at least a first unambiguous phase detecting circuit having two inputs being identical to the first and second input, respectively;

wherein
C1) the input of the first signal processing unit is coupled to the first magnet-signal output;
C2) the output of the first signal processing unit is coupled to the first input of the phase detection unit;
C3) the reference output is coupled to the second input of the phase detection unit;
C4) the input of the second signal processing unit is coupled to an output of the sensing unit;
C5) the output of the second signal processing unit is coupled to an input of the phase detection unit.

As has been explained above, some of the couplings may (partially) coincide, and some of the couplings may be indirect.

Features of the manufacturing methods correspond to features of corresponding sensors, and vice versa. Also, the respective effects and advantages correspond to each other.

The use according to the invention is a use of a second signal processing unit in a sensor for sensing an angular orientation of a magnet producing a magnetic field, for compensating for (undesired) phase deviations occurring in a first signal processing unit constructed identically to the second signal processing unit. In particular, signals outputted by the first and signals outputted by the second signal processing unit are fed to a phase detection unit for deriving phase differences between signals inputted to the phase detection unit, and more particularly reference signals are fed to the phase detection unit, which are independent of the magnetic field.

The invention also includes uses having features corresponding to features of corresponding sensors, and vice versa. Also, the respective effects and advantages correspond to each other.

Further embodiments and advantages emerge from the dependent claims and the figures.

BRIEF DESCRIPTION OF THE DRAWINGS

Below, the invention is described in more detail by means of examples and the included drawings. The figures show schematically.

DETAILED DESCRIPTION OF THE INVENTION

The described embodiments are meant as examples and shall not limit the invention.

In the Figures, analog signals are symbolized by lines which are thinner than lines which symbolize logic signals or digital signals, wherein this assignment is to be understood as one possible option.

An object of the invention is to improve magnetic orientation sensors, which are based on a phase detection method. In phase detection based sensors, a waveform is produced, which has a phase related to or representative of an angle to be measured. In such a sensor, a numerical value can be obtained in a straightforward way: it is basically sufficient to provide a clock for measuring a time and a counter for obtaining the sought angle in numerical (usually digital) form. This makes possible to render superfluous a conversion of a series of voltage levels and a computation of an ATAN (arc tangent) function as is required in other magnetic orientation sensors.

However, since the information about the physical quantity (angle) to be determined is contained in a phase of the signal, any phase shift occurring during the signal conditioning might lead to errors.

Architectures and configurations are suggested, which allow to stabilize the phase shift in the sensor and in particular during the signal conditioning, making it largely independent on the external conditions and also of undesired internal effects.

Initially, a prior art sensor shall be described which has a very simple architecture.

Figure 1:
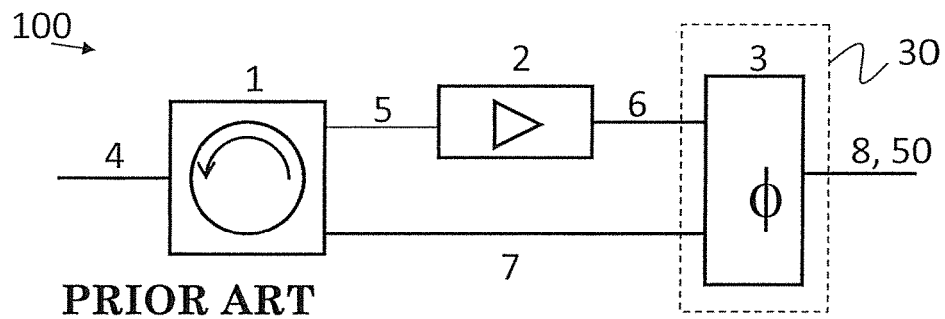
FIG. 1 a block diagrammatical illustration of a sensor known from prior art.

FIG. 1 shows a block diagrammatical illustration of a sensor 100 known from prior art. The sensor 100 is a sensor for sensing an angular orientation of a magnet producing a magnetic field. It includes a sensing unit 1, a signal processing unit 2, and a phase detection unit 30 including (or rather consisting of) an unambiguous phase detecting circuit 3.

The sensing unit 1 receives clock signals 4 (of a frequency fc) and outputs, besides reference signals 7 of frequency f0, raw magnetic signals 5 which are analog signals having a phase related to the sought angle. For accomplishing this, sensing unit 1 includes several magnetic field sensing devices such as Hall effect devices, and circuitry (also referred to as a scanning circuit) for repeatedly probing or scanning the magnetic field sensing devices. Concatenating the signals outputted by the probed magnetic field sensing devices yields the raw magnetic signals 5, which usually represent a staircase waveform approximating a sine-shaped wave of a frequency f0, wherein clock frequency fc is an integer multiple of frequency f0, and wherein 1/f0 is the cycle time for the probing of the magnetic field sensing devices. From various prior art documents, possibilities of realizing such a scanning circuit are known, c.f., e.g., the above-mentioned publications WO 2008/145662 A1 and WO 2012/151707 A1.

The raw magnetic signals are conditioned in signal processing unit 2, in order to create processed magnetic signals 6, which are logic signals of such a kind that the phase of the raising or of the falling edge is proportional to the sought angle.

Processed magnetic signals 6 are fed to phase detection unit 30, more particularly to a first input thereof (and to unambiguous phase detecting circuit 3). The second input of phase detection unit 30 is fed with reference signals 7, which are outputted by sensing unit 1 and constitute logic periodic signals independent of the magnetic field. Being logic periodic signals, reference signals 7 merely assume voltages representative of logical 1 and voltages representative of logical 0. Phase difference signals 8 outputted by unambiguous phase detecting circuit 3 and thus the signals outputted by phase detection unit 30 are indicative and usually even representative of the sought angle. It is therefore identical with output angle signals 50 of the sensor 100. Output angle signals 50, thus, usually are the sought angle in digital form, more particularly encoded in a series of bits.

The provision of reference signals 7 and of the unambiguous phase detecting circuit 3 can allow to distinguish all angles between 0° and 360°. In other words, there is no ambiguity of the determined angle. Imagining that unit 3 were, e.g., an XOR, or another not-unambiguous phase detection circuit, angles between 0° and 180° could not be distinguished from angles between 180° and 360°, thus leaving considerable uncertainty with respect to the actual angle describing the sought angular orientation of the magnetic field.

As will become clear from the above, any effect creating an undesired shift or modulation of processed magnetic signals 6, in particular effected in signal processing unit 2, will deteriorate the precision of the outputted angle. The inventors became aware of this problem and found ways of obtaining the sought angle in a more stable and more precise way. Drifts of the outputted signals which may be temperature-dependent or frequency dependent or originate from aging processes can lead to undesired phase deviations which may be largely compensated for by means of embodiments according to the invention.

In case of all the embodiments described below, in addition to a first signal processing unit 2, a second signal processing unit 2' is provided which is constructed (at least substantially) identically to the first signal processing unit 2—for the purpose of creating signals which have undergone at least substantially the same phase deviations as those to which (first) raw magnetic signals have been subjected while becoming (first) processed magnetic signals. These signals may then be used either for determining and removing the (undesired) phase deviations (by subtraction), for determining the (undesired) phase deviations and using these for controlling frequency fc in order to compensate for the undesired phase deviations, or for forming a phase difference between the first processed magnetic signal and the signals processed in the second signal processing unit, or for producing magnetic signals complementary to the first processed magnetic signals which nevertheless have undergone at least substantially the same phase deviations as the first processed magnetic signals have been subjected to.

Since several components of the following embodiments may be similar or even identical to those described in conjunction with FIG. 1, they will, not have to be described again.

Figure 2:
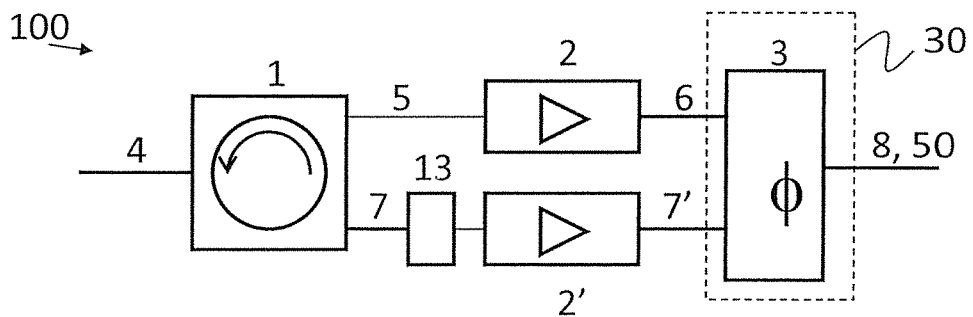
FIG. 2 a block diagrammatical illustration of a sensor according to a first embodiment.

In a first embodiment, which is illustrated in FIG. 2, first raw magnetic signals 5 are fed to a first input of the unambiguous phase detecting circuit 3 via the first signal processing unit 2. The reference signals 7 are fed to a second input of the unambiguous phase detecting circuit 3 via an attenuator 13 and the second signal processing unit.

Accordingly, raw magnetic signals 5 are processed so as to obtain processed magnetic signals 6. The phase of the processed magnetic signals 6, thus, is composed of a portion related to the magnetic field and another portion, the (undesired) phase deviation, which is not related to the magnetic field.

And reference signals 7 are, after attenuation in attenuator 13, processed in second signal processing unit 2', such that they have undergone at least approximately the same (undesired) phase deviations as processed magnetic signals 6 have undergone.

Thus, processed magnetic signals 6 and processed reference signals 7' are fed to unambiguous phase detecting circuit 3, such that in unambiguous phase detection unit 30, the (undesired) phase deviations present in both inputs at least practically cancel, and a precise and stable output angle signal is obtained.

As is also the case in the other described embodiments, sensing unit 1 is fed with a clock signal 4 (of frequency fc) from which reference signal 7 of frequency f0 is obtained.

The first embodiment thus can be established by a sensor 100 for sensing an angular orientation of a magnet producing a magnetic field, wherein the sensor 100 includes a sensing unit 1 including:

N≥2 magnetic field sensing devices;
a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5 which is a signal including a frequency component of the frequency f0;
at least a first magnet-signal output for outputting the first raw magnetic signal 5; and
a reference output for outputting a reference signal 7, which is a logic signal of the frequency f0, which is independent of the magnetic field;

wherein the sensor 100 furthermore includes:
a first signal processing unit 2 and a second signal processing unit 2', which are identically constructed, each having an input and an output;
a phase detection unit 30 having at least a first and a second input, for deriving phase differences between signals inputted to the phase detection unit 30, and for obtaining in dependence of the phase differences, and for outputting a signal referred to as output angle signal 50 representative of an angle related to the angular orientation, the phase detection unit including at least a first unambiguous phase detecting circuit 3 having two inputs being identical to the first and second input, respectively;

wherein
C1a) the input of the first signal processing unit 2 is coupled to the first magnet-signal output;
C1b) the output of the first signal processing unit 2 is coupled to the first input of the phase detection unit 30;
C1c) the reference output is coupled to the input of the second signal processing unit 2';
C1d) the output of the second signal processing unit 2' is coupled to the second input of the phase detection unit 30.

And in particular, it may be provided that the sensor 100 includes an attenuator 13, wherein coupling C1c) is replaced by the coupling:
C1c') the reference output is coupled to the input of the second signal processing unit 2' via the attenuator 13.

Therein, any one of the couplings (C1a), C1b), C1c), C1c'), C1d)) may in particular be a direct coupling or at least a coupling in which no component is coupled between the coupled items which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

Figure 3:
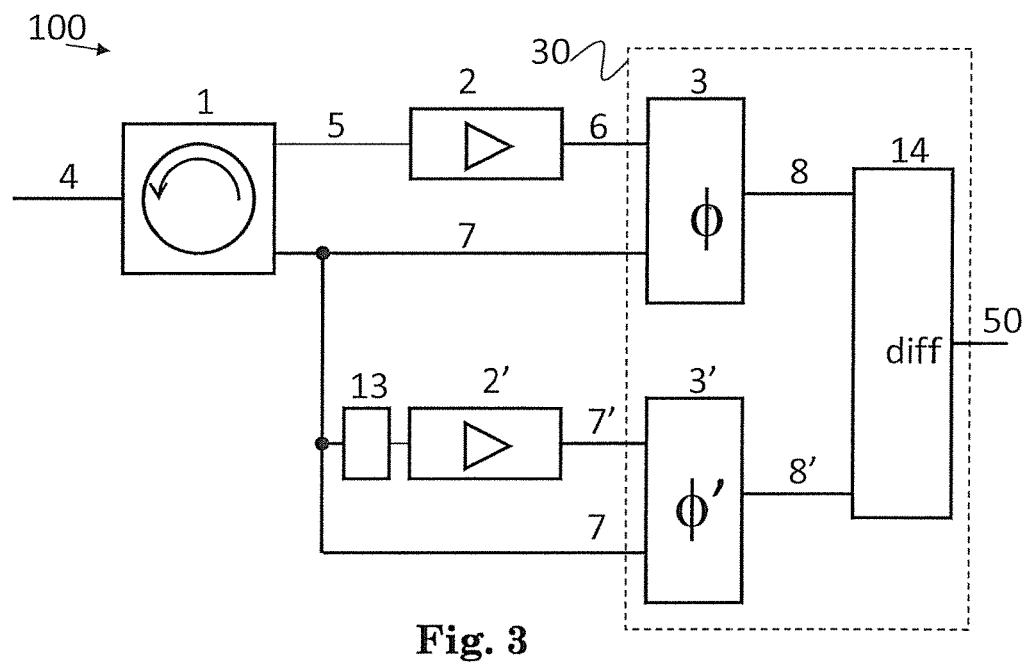
FIG. 3 a block diagrammatical illustration of a sensor according to a second embodiment.

In a second embodiment, which is illustrated in FIG. 3, phase detection unit 30 includes two unambiguous phase detecting circuits 3, 3'. First raw magnetic signals 5 are fed to a first input of the unambiguous phase detecting circuit 3 via the first signal processing unit 2. Reference signals 7 are fed to a second input of the unambiguous phase detecting circuit 3.

Accordingly, raw magnetic signals 5 are processed so as to obtain processed magnetic signals 6. The phase of the processed magnetic signals 6 thus is composed of a portion related to the magnetic field and another portion, the (undesired) phase deviation, which is not related to the magnetic field.

Reference signal 7 is fed to unambiguous phase detecting circuit 3 without (or at least substantially without) having acquired a phase deviation. Reference signal 7 is not related to the magnetic field.

Thus, in unambiguous phase detecting circuit 3, a phase difference signal 8 is obtained, which is composed of both, the desired magnetic-field related phase shift, and the (undesired) phase deviations.

Reference signal 7 is, however, furthermore fed to an input of unambiguous phase detecting circuit 3' without (or at least substantially without) having acquired a phase deviation.

And, in addition, reference signal 7 is fed, via an attenuator 13, to signal processing unit 2'. And the so-obtained processed reference signal 7' is fed to the other input of unambiguous phase detecting circuit 3'. This processed reference signal 7' has undergone at least approximately the same (undesired) phase deviations as were acquired by processed magnetic signals 6.

Thus, in unambiguous phase detecting circuit 3', a phase difference signal 8' is obtained, which is at least approximately representative of the phase deviations, which are also included in phase difference signal 8 outputted by unambiguous phase detecting circuit 3.

Suitably forming a difference of the two phase difference signals 8, 8' thus makes possible to at least approximately remove the (undesired) phase deviations, thus to obtain an output angle signal 50 which is very precise and stable.

For obtaining the difference, a subtractor 14 is provided. Note that an adder could be used, too, wherein then, an inverter (i.e., for digital signals, a component for changing the sign) could be inserted between one of the unambiguous phase detecting circuits 3, 3' and the adder (at the position of subtractor 14), or, rather, the wiring to the two inputs of one of the unambiguous phase detecting circuits 3, 3' could be interchanged.

The second embodiment thus can be established by a sensor 100 for sensing an angular orientation of a magnet producing a magnetic field, wherein the sensor 100 includes a sensing unit 1 including:
N≥2 magnetic field sensing devices;
a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5, which is a signal including a frequency component of the frequency f0;
at least a first magnet-signal output for outputting the first raw magnetic signal 5; and
a reference output for outputting a reference signal 7, which is a logic signal of the frequency f0, which is independent of the magnetic field; and wherein the sensor furthermore includes:
a first signal processing unit 2 and a second signal processing unit 2', which are identically constructed, each having an input and an output;
a phase detection unit 30 having at least a first, a second, a third and a fourth input, for deriving phase differences between signals inputted to the phase detection unit, and for obtaining in dependence of the phase differences, and for outputting a signal referred to as output angle signal 50 representative of an angle related to the angular orientation, the phase detection unit 30 including at least a first unambiguous phase detecting circuit 3 having two inputs being identical to the first and second input, respectively, and a second unambiguous phase detecting circuit 3' having two inputs being identical to the third and fourth input, respectively;

wherein

C2a) the input of the first signal processing unit 2 is coupled to the first magnet-signal output;

C2b) the output of the first signal processing unit 2 is coupled to the first input of the phase detection unit 30;

C2c) the reference output is coupled to the second input of the phase detection unit 30;

C2d) the reference output is coupled to the input of the second signal processing unit 2';

C2e) the output of the second signal processing unit 2' is coupled to the third input of the phase detection unit 30;

C2f) the reference output is coupled to the fourth input of the phase detection unit 30.

And in particular, it may be provided that the sensor 100 includes an attenuator 13, wherein coupling C2d) is replaced by the coupling:

C2d') the reference output is coupled to the input of the second signal processing unit 2' via the attenuator 13.

Therein, any one of the couplings (C2a), C2b), C2c), C2d), C2d'), C2e), C2f)) may in particular be a direct coupling or at least a coupling in which no component is coupled between the coupled items, which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

A third embodiment is very similar to the second embodiment. Whereas in the second embodiment, the second unambiguous phase detecting circuit 3' is fed with (unprocessed) reference signals 7 and processed reference signals 7', in the third embodiment, the phase deviations are derived by feeding to the second unambiguous phase detecting circuit 3' the processed magnetic signals 6 and these signals after having processed them another time (namely in signal processing unit 2').

Figure 4:
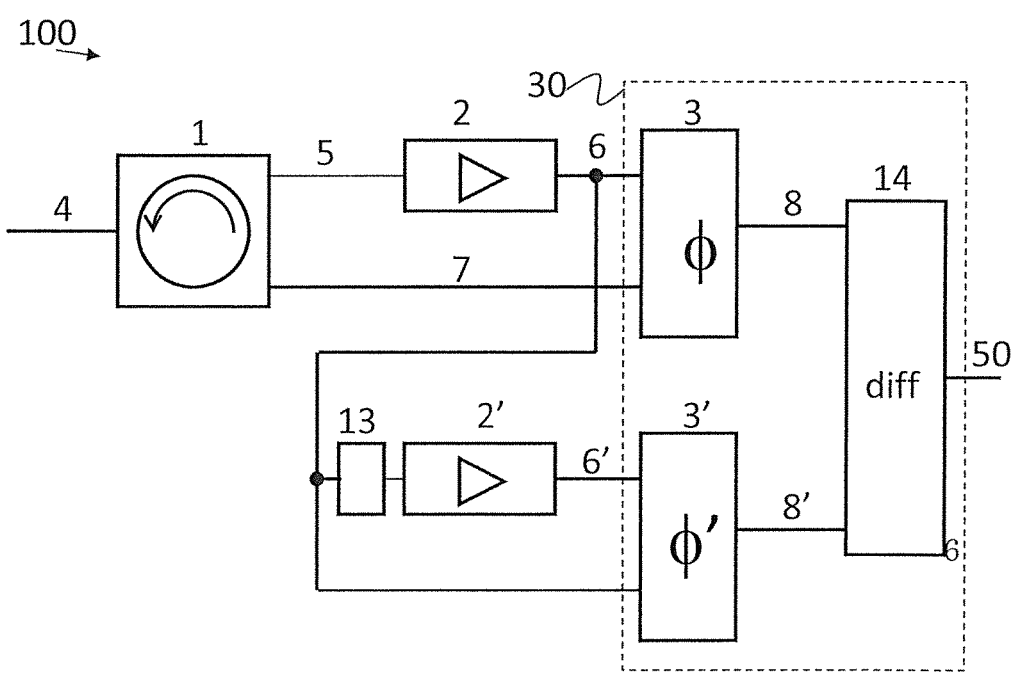
FIG. 4 a block diagrammatical illustration of a sensor according to a third embodiment.

Accordingly, in the third embodiment, which is illustrated in FIG. 4, phase detection unit 30 includes two unambiguous phase detecting circuits 3, 3'. First raw magnetic signals 5 are fed to a first input of the unambiguous phase detecting circuit 3 via the first signal processing unit 2. Reference signals 7 are fed to a second input of the unambiguous phase detecting circuit 3.

Accordingly, raw magnetic signals 5 are processed so as to obtain processed magnetic signals 6. The phase of the processed magnetic signals 6 thus is composed of a portion related to the magnetic field and another portion, the (undesired) phase deviation, which is not related to the magnetic field.

Reference signal 7 is fed to unambiguous phase detecting circuit 3 without (or at least substantially without) having acquired a phase deviation. Reference signal 7 is not related to the magnetic field.

Thus, in unambiguous phase detecting circuit 3, a phase difference signal 8 is obtained, which is composed of both, the desired magnetic-field related phase shift, and the (undesired) phase deviations.

Processed magnetic signals 6 are, however, furthermore fed to an input of unambiguous phase detecting circuit 3' without (or at least substantially without) having acquired an additional phase deviation.

And, in addition, processed magnetic signal 6 is fed, via an attenuator 13, to signal processing unit 2'. And the so-obtained two-times processed magnetic signal 6' is fed to the other input of unambiguous phase detecting circuit 3'. Relative to processed magnetic signal 6, this two-times processed magnetic signal 6' has undergone at least approximately the same (undesired) phase deviations as were acquired already by processed magnetic signals 6 themselves.

Thus, in unambiguous phase detecting circuit 3', a phase difference signal 8' is obtained, which is at least approximately representative of the phase deviations, which are also comprised in phase difference signal 8 outputted by unambiguous phase detecting circuit 3.

Suitably forming a difference of the two phase difference signals 8, 8' thus makes possible to at least approximately remove the (undesired) phase deviations, thus to obtain an output angle signal 50 which is very precise and stable.

For obtaining the difference, a subtractor 14 is provided. Note that an adder could be used, too, wherein then, an inverter (i.e., for digital signals, a component for changing the sign) could be inserted between one of the unambiguous phase detecting circuits 3, 3' and the adder (at the position of subtractor 14), or, rather, the wiring to the two inputs of one of the unambiguous phase detecting circuits 3, 3' could be interchanged.

The third embodiment thus can be established by a sensor 100 for sensing an angular orientation of a magnet producing a magnetic field, wherein the sensor 100 includes a sensing unit 1 including:

N≥2 magnetic field sensing devices;

a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5, which is a signal including a frequency component of the frequency f0;

at least a first magnet-signal output for outputting the first raw magnetic signal 5; and a reference output for outputting a reference signal 7, which is a logic signal of the frequency f0, which is independent of the magnetic field; and wherein the sensor furthermore includes:

a first signal processing unit 2 and a second signal processing unit 2', which are identically constructed, each having an input and an output;

a phase detection unit 30 having at least a first, a second, a third and a fourth input, for deriving phase differences between signals inputted to the phase detection unit, and for obtaining in dependence of the phase differences, and for outputting a signal referred to as output angle signal 50 representative of an angle related to the angular orientation, the phase detection unit 30 including at least a first unambiguous phase detecting circuit 3 having two inputs being identical to the first and second input, respectively, and a second unambiguous phase detecting circuit 3' having two inputs being identical to the third and fourth input, respectively;

wherein

C3a) the input of the first signal processing unit 2 is coupled to the first magnet-signal output;

C3b) the output of the first signal processing unit 2 is coupled to the first input of the phase detection unit 30;

C3c) the reference output is coupled to the second input of the phase detection unit 30;

C3d) the output of the first signal processing unit 2 is coupled to the input of the second signal processing unit 2';

C3e) the output of the second signal processing unit 2' is coupled to the third input of the phase detection unit 30;

C3f) the output of the first signal processing unit 2 is coupled to the fourth input of the phase detection unit 30.

And in particular, it may be provided that the sensor 100 includes an attenuator 13, wherein coupling C3d) is replaced by the coupling C3d') the output of the first signal processing unit 2 is coupled to the input of the second signal processing unit 2' via the attenuator 13.

Therein, any one of the couplings (C2a), C2b), C2c), C2d), C2d'), C1e), C2f)) may in particular be a direct coupling or at least a coupling in which no component is coupled between the coupled items, which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

Figure 5:
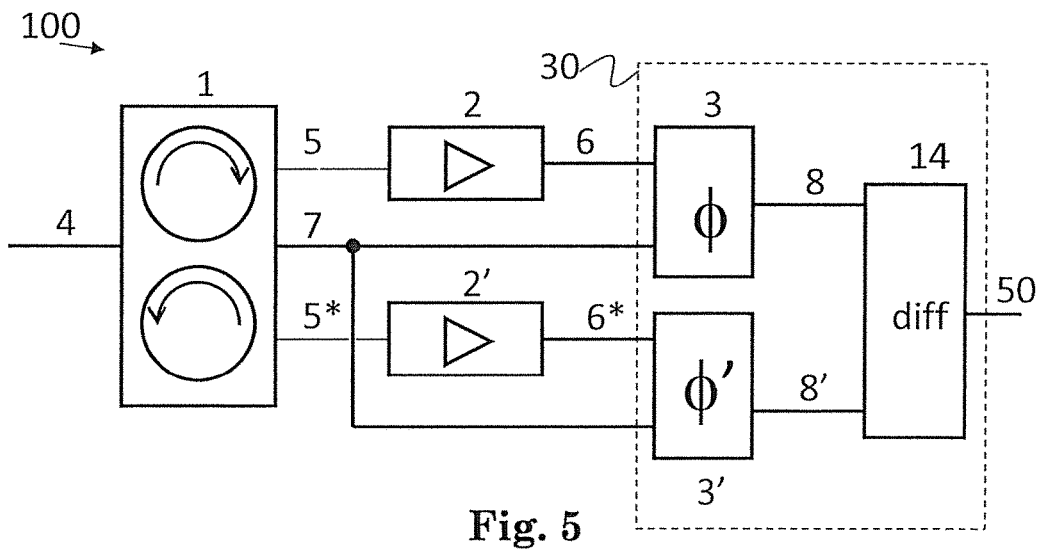
FIG. 5 a block diagrammatical illustration of a sensor according to a fourth embodiment.

In a fourth embodiment, which is illustrated in FIG. 5, phase detection unit 30 includes two unambiguous phase detecting circuits 3, 3'. And in addition, sensing unit 1 outputs not only first raw magnetic signals 5, but also second raw magnetic signals 5*.

For obtaining the second raw magnetic signals 5*, a second preset order (of probing magnetic field sensing devices) is applied in which at least two of the magnetic field sensing devices are probed.

In particular, the preset orders and the set or sets of magnetic field sensing devices, which are probed in the respective preset orders, are selected such that the magnetic field is probed in a first sense of rotation with respect to a sensing plane of the sensing unit when the magnetic field sensing devices are probed in the first order, and that the magnetic field is probed in a second sense of rotation with respect to the sensing plane of the sensing unit when the magnetic field sensing devices are probed in the second order, and wherein the first and second senses of rotation are mutually opposite.

More particularly, it can be provided that different vectorial components of the magnetic field in the sensing plane are probed by the probing, and that thereby, the probed magnetic field components describe a rotation (or at least indicate a sense of rotation) about an axis perpendicular to the sensing plane; or it can be provided that a component of the magnetic field is probed in different locations in space by the probing, and the locations where the magnetic field component is probed describe a rotation about an axis perpendicular to the sensing plane.

For the sake of simplicity, one could refer to "counter-rotating raw magnetic signals" and to "counter-rotating probing" when referring to the first and the second raw magnetic signals 5, 5* and to the way of obtaining them, respectively.

In the fourth embodiment, first raw magnetic signals 5 are fed to a first input of the unambiguous phase detecting circuit 3 via the first signal processing unit 2. Reference signals 7 are fed to a second input of the unambiguous phase detecting circuit 3.

Accordingly, raw magnetic signals 5 are processed so as to obtain processed magnetic signals 6. The phase of the processed magnetic signals 6 thus is composed of a portion related to the magnetic field and another portion, the (undesired) phase deviation, which is not related to the magnetic field.

Reference signal 7 is fed to unambiguous phase detecting circuit 3 without (or at least substantially without) having acquired a phase deviation. Reference signal 7 is not related to the magnetic field.

Thus, in unambiguous phase detecting circuit 3, a phase difference signal 8 is obtained, which is composed of both, the desired magnetic-field related phase shift, and the (undesired) phase deviations.

Furthermore, second raw magnetic signals 5* (counter-rotating with respect to the first raw magnetic signals 5) are fed to a first input of the unambiguous phase detecting circuit 3' via the second signal processing unit 2'. Reference signals 7 are fed to a second input of the unambiguous phase detecting circuit 3'.

Accordingly, (counter-rotating) raw magnetic signals 5* are processed so as to obtain second processed magnetic signals 6*. The phase of the second processed magnetic signals 6* thus is composed of a portion related to the magnetic field (which is complementary to the corresponding portion of first processed magnetic signal 6) and another portion, the (undesired) phase deviation, which is not related to the magnetic field.

Reference signal 7 is fed to unambiguous phase detecting circuit 3' without (or at least substantially without) having acquired a phase deviation. Reference signal 7 is not related to the magnetic field.

Thus, in unambiguous phase detecting circuit 3', a phase difference signal 8' is obtained, which is composed of both, the desired magnetic-field related phase shift (which is of opposite sign with respect to the corresponding component in phase difference signal 8'), and the (undesired) phase deviations.

Suitably forming a sum (or a difference) of the two phase difference signals 8, 8' thus makes possible to at least approximately remove the (undesired) phase deviations and thus to obtain an output angle signal 50 which is very precise and stable. Output angle 50 in this case corresponds to twice the angle indicative of the orientation of the magnetic field.

For obtaining the sum or difference, a subtractor 14 is provided. Note that an adder could be used, too, wherein then, an inverter (i.e., for digital signals, a component for changing the sign) could be inserted between one of the unambiguous phase detecting circuits 3, 3' and the adder (at the position of subtractor 14), or, rather, the wiring to the two inputs of one of the unambiguous phase detecting circuits 3, 3' could be interchanged.

The fourth embodiment thus can be established by a sensor 100 for sensing an angular orientation of a magnet producing a magnetic field, wherein the sensor 100 includes a sensing unit 1 including:

N≥2 magnetic field sensing devices;

a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5, which is a signal including a frequency component of the frequency f0; and for repeatedly, at a frequency f0, sequentially probing in a second preset order at least two of the N magnetic field sensing devices and concatenating signals outputted by the respective probed magnetic field sensing devices in reaction to the magnetic field for obtaining an analog signal referred to as second raw magnetic signal 5*, which is a signal including a frequency component of the frequency f0;
at least a first magnet-signal output for outputting the first raw magnetic signal 5;
at least a second magnet-signal output for outputting the second raw magnetic signal 5*; and
a reference output for outputting a reference signal 7, which is a logic signal of the frequency f0, which is independent of the magnetic field; and wherein the sensor furthermore includes:
a first signal processing unit 2 and a second signal processing unit 2', which are identically constructed, each having an input and an output;
a phase detection unit 30 having at least a first, a second, a third and a fourth input, for deriving phase differences between signals inputted to the phase detection unit, and for obtaining in dependence of the phase differences, and for outputting a signal referred to as output angle signal 50 representative of an angle related to the angular orientation, the phase detection unit 30 including at least a first unambiguous phase detecting circuit 3 having two inputs being identical to the first and second input, respectively, and a second unambiguous phase detecting circuit 3' having two inputs being identical to the third and fourth input, respectively;

wherein
C4a) the input of the first signal processing unit 2 is coupled to the first magnet-signal output;
C4b) the output of the first signal processing unit 2 is coupled to the first input of the phase detection unit 30;
C4c) the reference output is coupled to the second input of the phase detection unit 30;
C4d) the second magnet-signal output is coupled to the input of the second signal processing unit 2';
C4e) the output of the second signal processing unit 2' is coupled to the third input of the phase detection unit 30;
C4f) the reference output is coupled to the fourth input of the phase detection unit 30.

Therein, any one of the couplings (C4a), C4b), C4c), C4d), C4e), C4f)) may in particular be a direct coupling or at least a coupling in which no component is coupled between the coupled items, which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

A fifth and a sixth embodiment are similar to the second and third embodiments, respectively. However, instead of forming a difference (or sum) of the phase difference signals 8 and 8', phase difference signals 8 are taken as output angle signals 50, whereas phase difference signals 8' are used in a control loop for controlling clock frequency fc. Phase deviations occurring in signal processing unit 2 can be kept constant via the closed-loop control, because signal processing units 2, 2' usually show frequency dependencies (which produce frequency-dependent phase deviations.)

Figure 6:
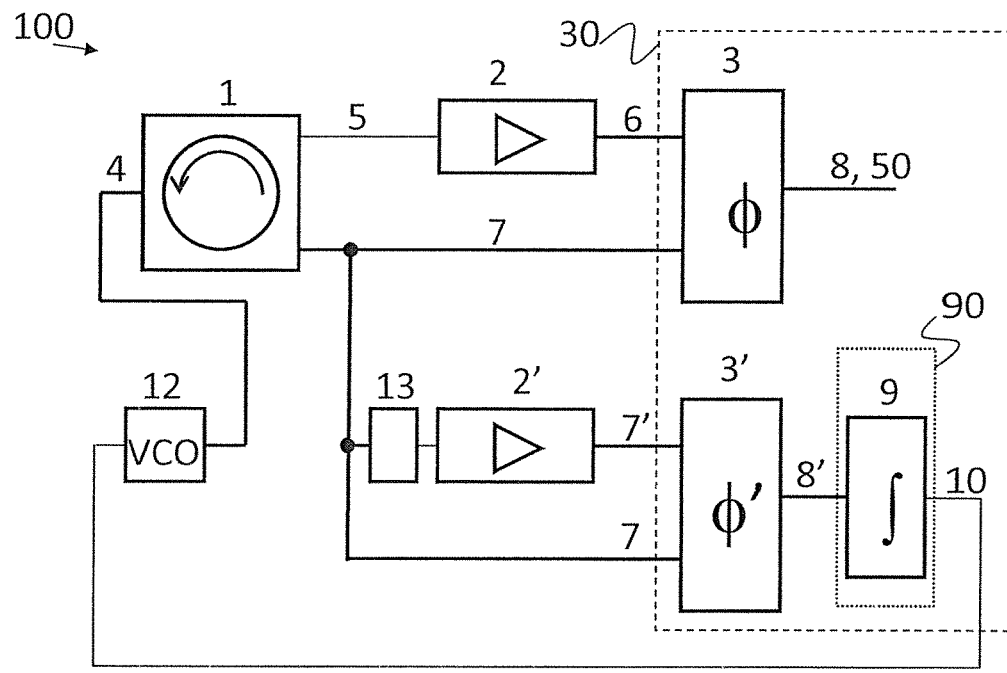
FIG. 6 a block diagrammatical illustration of a sensor according to a fifth embodiment.

In the fifth embodiment, which is illustrated in FIG. 6, phase detection unit 30 includes two unambiguous phase detecting circuits 3, 3'. First raw magnetic signals 5 are fed to a first input of the unambiguous phase detecting circuit 3 via the first signal processing unit 2. Reference signals 7 are fed to a second input of the unambiguous phase detecting circuit 3.

Accordingly, raw magnetic signals 5 are processed so as to obtain processed magnetic signals 6. The phase of the processed magnetic signals 6 thus is composed of a portion related to the magnetic field and another portion, the (undesired) phase deviation, which is not related to the magnetic field.

Reference signal 7 is fed to unambiguous phase detecting circuit 3 without (or at least substantially without) having acquired a phase deviation. Reference signal 7 is not related to the magnetic field.

Thus, in unambiguous phase detecting circuit 3, a phase difference signal 8 is obtained, which is composed of both, the desired magnetic-field related phase shift, and the (undesired) phase deviations.

Reference signal 7 is, however, furthermore fed to an input of unambiguous phase detecting circuit 3' without (or at least substantially without) having acquired a phase deviation.

And, in addition, reference signal 7 is fed, via an attenuator 13, to signal processing unit 2'. And the so-obtained processed reference signal 7' is fed to the other input of unambiguous phase detecting circuit 3'. This processed reference signal 7' has undergone at least approximately the same (undesired) phase deviations as were acquired by processed magnetic signals 6.

Thus, in unambiguous phase detecting circuit 3', a phase difference signal 8' is obtained, which is at least approximately representative of the phase deviations, which are also included in phase difference signal 8 outputted by unambiguous phase detecting circuit 3.

This phase difference signal 8' can be used for controlling the frequency fc of a clock generator 12, e.g., a voltage-controlled oscillator, in order to keep phase difference signal 8' and thus the phase deviations constant. Filters and/or amplifiers in second signal processing unit 2' and/or other sensor components usually show a frequency dependence of (undesired) phase shifts (or phase deviations) they create.

The clock generator may be included in the sensor 100 or be external to sensor 100. It includes a control input by means of which frequency fc of the outputted clock signal 4 is settable (selectable, adjustable). Clock signal 4 is fed to sensing unit 1, or the output of the clock generator 12 is coupled to the input of sensing unit 1.

In order to accomplish the closed-loop control, phase detection unit 30 includes an integrating unit 90 including an integrator 9, which is fed by phase difference signal 8'. The output of integrating unit 90 (and of integrator 9) is coupled to the control input of clock generator 12.

Thus, the fifth embodiment makes possible to obtain an output angle signal 50, which is very precise and stable. Note that the (constant) added phase deviation is not particularly disturbing, because it is merely a constant added in the output angle signal, and this merely corresponds to having (constantly) shifted the angle considered as 0°.

The fifth embodiment thus can be established by a sensor 100 for sensing an angular orientation of a magnet producing a magnetic field, wherein the sensor 100 includes a sensing unit 1 including:
N≥2 magnetic field sensing devices;
a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5, which is a signal including a frequency component of the frequency f0;

at least a first magnet-signal output for outputting the first raw magnetic signal 5; and a reference output for outputting a reference signal 7 which is a logic signal of the frequency f0, which is independent of the magnetic field; and wherein the sensor furthermore includes:

a first signal processing unit 2 and a second signal processing unit 2', which are identically constructed, each having an input and an output;

a phase detection unit 30 having at least a first, a second, a third and a fourth input, for deriving phase differences between signals inputted to the phase detection unit, and for obtaining in dependence of the phase differences, and for outputting a signal referred to as output angle signal 50 representative of an angle related to the angular orientation, the phase detection unit 30 including at least a first unambiguous phase detecting circuit 3 having two inputs being identical to the first and second input, respectively, and a second unambiguous phase detecting circuit 3' having two inputs being identical to the third and fourth input, respectively;

wherein the sensing unit 1 includes an input for receiving a clock signal 4, and wherein the phase detection circuit 30 includes an integrating unit 90 for producing and outputting at its output a signal referred to as control signal 10, the integrating unit 90 including an integrator 9, wherein the control signal 10 is in particular suitable for controlling a frequency fc of a clock signal 4 of a clock generator 12, and wherein C5a) the input of the first signal processing unit 2 is coupled to the first magnet-signal output;

C5b) the output of the first signal processing unit 2 is coupled to the first input of the phase detection unit 30;

C5c) the reference output is coupled to the second input of the phase detection unit 30;

C5d) the reference output is coupled to the input of the second signal processing unit 2';

C5e) the output of the second signal processing unit 2' is coupled to the third input of the phase detection unit 30;

C5f) the reference output is coupled to the fourth input of the phase detection unit 30;

C5g) an output of the second unambiguous phase detecting circuit 3' is coupled to an input of the integrating unit 90.

And in particular, it may be provided that the sensor 100 includes an attenuator 13, wherein coupling C5d) is replaced by the coupling:

C5d') the reference output is coupled to the input of the second signal processing unit 2' via the attenuator 13.

Therein, any one of the couplings (C5a), C5b), C5c), C5d), C5d'), C5e), C5f), C5g)) may in particular be a direct coupling or at least a coupling in which no component is coupled between the coupled items, which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

A sixth embodiment is very similar to the fifth embodiment. Whereas in the fifth embodiment, the second unambiguous phase detecting circuit 3' is fed with (unprocessed) reference signals 7 and processed reference signals 7', in the sixth embodiment, the phase deviations are derived by feeding to the second unambiguous phase detecting circuit 3' the processed magnetic signals 6 and these signals after having processed them another time (namely in signal processing unit 2').

Figure 7:
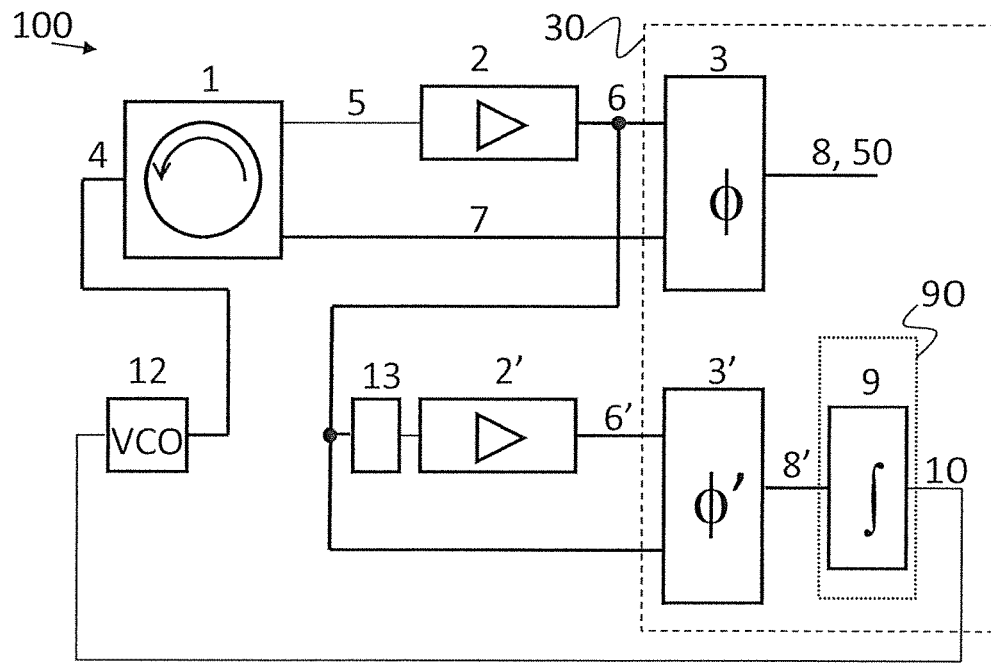
FIG. 7 a block diagrammatical illustration of a sensor according to a sixth embodiment.

Accordingly, in the sixth embodiment, which is illustrated in FIG. 7, phase detection unit 30 includes two unambiguous phase detecting circuits 3, 3'. First raw magnetic signals 5 are fed to a first input of the unambiguous phase detecting circuit 3 via the first signal processing unit 2. Reference signals 7 are fed to a second input of the unambiguous phase detecting circuit 3.

Accordingly, raw magnetic signals 5 are processed so as to obtain processed magnetic signals 6. The phase of the processed magnetic signals 6 thus is composed of a portion related to the magnetic field and another portion, the (undesired) phase deviation, which is not related to the magnetic field.

Reference signal 7 is fed to unambiguous phase detecting circuit 3 without (or at least substantially without) having acquired a phase deviation. Reference signal 7 is not related to the magnetic field.

Thus, in unambiguous phase detecting circuit 3, a phase difference signal 8 is obtained which is composed of both, the desired magnetic-field related phase shift, and the (undesired) phase deviations.

Processed magnetic signals 6 are, however, furthermore fed to an input of unambiguous phase detecting circuit 3' without (or at least substantially without) having acquired an additional phase deviation.

And, in addition, processed magnetic signal 6 is fed, via an attenuator 13, to signal processing unit 2'. And the so-obtained two-times processed magnetic signal 6' is fed to the other input of unambiguous phase detecting circuit 3'. Relative to processed magnetic signal 6, this two-times processed magnetic signal 6' has undergone at least approximately the same (undesired) phase deviations as were acquired already by processed magnetic signals 6 themselves.

Thus, in unambiguous phase detecting circuit 3', a phase difference signal 8' is obtained, which is at least approximately representative of the phase deviations, which are also comprised in phase difference signal 8 outputted by unambiguous phase detecting circuit 3.

Analogously to the fourth embodiment, this phase difference signal 8' can be used for controlling the frequency fc of a clock generator 12, e.g., a voltage-controlled oscillator, in order to keep phase difference signal 8' and thus the phase deviations constant. Filters and/or amplifiers in second signal processing unit 2' and/or other sensor components usually show a frequency dependence of phase shifts they create.

The clock generator may be included in the sensor 100 or be external to sensor 100. It includes a control input by means of which frequency fc of the outputted clock signal 4 is settable (selectable, adjustable). Clock signal 4 is fed to sensing unit 1, or the output of the clock generator 12 is coupled to the input of sensing unit 1.

In order to accomplish the closed-loop control, phase detection unit 30 includes an integrating unit 90 including an integrator 9, which is fed by phase difference signal 8'. The output of integrating unit 90 (and of integrator 9) is coupled to the control input of clock generator 12.

Thus, the sixth embodiment makes possible to obtain an output angle signal 50, which is very precise and stable. Note that the (constant) added phase deviation is not particularly disturbing, because it is merely a constant added in the output angle signal, and this merely corresponds to having (constantly) shifted the angle considered as 0°.

The sixth embodiment thus can be established by a sensor 100 for sensing an angular orientation of a magnet producing a magnetic field, wherein the sensor 100 includes a sensing unit 1 including:
- $N \geq 2$ magnetic field sensing devices;
- a scanning circuit for repeatedly, at a frequency f0, sequentially probing in a first preset order at least two of the N magnetic field sensing devices and concatenating signals outputted by the respective probed magnetic field sensing devices in reaction to the magnetic field for obtaining an analog signal referred to as first raw magnetic signal 5, which is a signal including a frequency component of the frequency f0;
- at least a first magnet-signal output for outputting the first raw magnetic signal 5; and
- a reference output for outputting a reference signal 7, which is a logic signal of the frequency f0, which is independent of the magnetic field; and wherein the sensor furthermore includes:
- a first signal processing unit 2 and a second signal processing unit 2', which are identically constructed, each having an input and an output;
- a phase detection unit 30 having at least a first, a second, a third and a fourth input, for deriving phase differences between signals inputted to the phase detection unit, and for obtaining in dependence of the phase differences, and for outputting a signal referred to as output angle signal 50 representative of an angle related to the angular orientation, the phase detection unit 30 including at least a first unambiguous phase detecting circuit 3 having two inputs being identical to the first and second input, respectively, and a second unambiguous phase detecting circuit 3' having two inputs being identical to the third and fourth input, respectively;

wherein the sensing unit 1 includes an input for receiving a clock signal 4, and wherein the phase detection circuit 30 includes an integrating unit 90 for producing and outputting at its output a signal referred to as control signal 10, the integrating unit 90 including an integrator 9, wherein the control signal 10 is in particular suitable for controlling a frequency fc of a clock signal 4 of a clock generator 12, and wherein:

C6a) the input of the first signal processing unit 2 is coupled to the first magnet-signal output;

C6b) the output of the first signal processing unit 2 is coupled to the first input of the phase detection unit 30;

C6c) the reference output is coupled to the second input of the phase detection unit 30;

C6d) the output of the first signal processing unit 2 is coupled to the input of the second signal processing unit 2';

C6e) the output of the second signal processing unit 2' is coupled to the third input of the phase detection unit 30;

C6f) the output of the first signal processing unit 2 is coupled to the fourth input of the phase detection unit 30.

C6g) an output of the second unambiguous phase detecting circuit 3' is coupled to an input of the integrating unit 90.

And in particular, it may be provided that the sensor 100 includes an attenuator 13, wherein coupling C6d) is replaced by the coupling C6d') the output of the first signal processing unit 2 is coupled to the input of the second signal processing unit 2' via the attenuator 13.

Therein, any one of the couplings (C6a), C6b), C6c), C6d), C6d'), C6e), C6f), C6g)) may in particular be a direct coupling or at least a coupling in which no component is coupled between the coupled items, which would significantly change a phase of an analog signal or a value of a digital signal or convert an analog signal into a digital signal or vice versa. More particularly, it can be provided that no electric or electronic component (active or passive) is coupled between the coupled items (wherein, of course, an item providing the coupling, such as a circuit path or conductor track, is present).

In any case and, in particular, in any one of the described embodiments, the respective unambiguous phase detecting circuit 3 or 3' may be constructed as described in conjunction with FIG. 9, cf. below.

In any case and, in particular, in any one of the described embodiments, the respective signal processing units 2 and 2' may be constructed as described in conjunction with FIG. 10, cf. below.

In any case and, in particular, in any one of the described embodiments, an unambiguous phase detecting circuit is provided for measuring the length of time between an edge (raising or falling) of a first inputted logic cycling signal and an edge (raising or falling) of a second inputted logic cycling signal. The result usually is provided as a numerical (digital) signal representative if an angle.

Various ways of designing the sensing unit 1 are possible. For example, a circular sensing structure as described in the above-mentioned WO 2008/145662 A1 may be used, wherein in case of the fourth embodiment two such structures may be used, operated in counter-rotating fashion.

Figure 8:
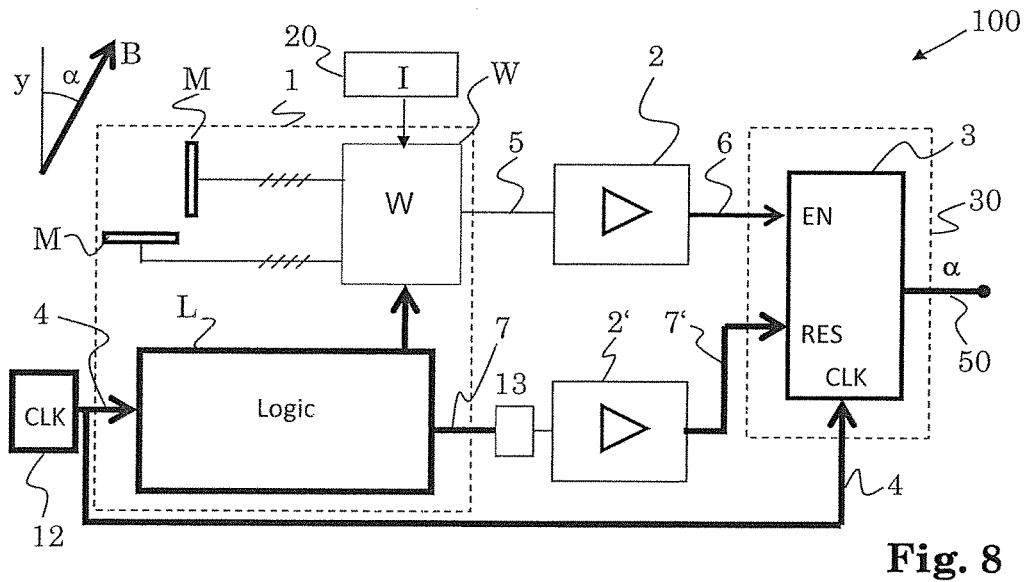
FIG. 8 a block-diagrammatical illustration of a sensor.

FIG. 8 is a schematical a block-diagrammatical illustration of a sensor 100, which is a rather detailed example for the above-described first embodiment, wherein sensing unit 1 is illustrated in great detail—as an example.

Most of the components illustrated in FIG. 8 were already described above (explaining their respective function), cf. in particular FIG. 2 (and FIG. 1). However, in the example of FIG. 8, sensing unit 1 is shown to include two magnetic field sensing devices M such as two Hall effect devices or two MR effect devices and a wiring unit W for providing the magnetic field sensing devices M with bias signals, such as bias currents and for receiving from the magnetic field sensing devices M the correspondingly outputted signals related to the magnetic field such as Hall voltages in case of Hall effect devices as magnetic field sensing devices M. For providing the bias signals, a bias signal source 20, e.g., a current source, can be provided which may be external to sensor 100 or rather be included in sensor 100 and which may be provided in sensing unit 1.

Sensing unit 1 furthermore includes a control unit L for controlling the wiring unit W for providing suitable connections between magnetic field sensing devices M and the bias signal source 20 and the processing unit 2, such that raw magnetic signals 5 are produced and fed to signal processing unit 2. Sequentially probing (or "scanning") the magnetic field sensing devices M is accomplished this way, and usually, a bias signal applied to a magnetic field sensing devices M while it is probed is constant, e.g., a constant current. Raw magnetic signals 5 are thus staircase signals (at least provided that the magnetic field remains unchanged during the time of probing). And typically, the staircase signal is an approximation to a sine-shaped signal.

Control unit L also outputs reference signals 7. It is provided with clock signals 4 by clock generator 12.

Sensor 100 is a sensor for sensing an angular orientation of a projection B (illustrated in the upper left of FIG. 8) of a magnetic field into a sensing plane of the sensing unit 1, wherein the sensing plane is the drawing plane in FIG. 8, and wherein the angular orientation is described by an angle α. Angle α may be taken relative to a reference such as a (coordinate) axis y. Output angle signals 50 are representative of this angle α.

Further details concerning the sensing unit 1 of FIG. 8 and its component can be found in the incorporated WO 2012/151707 A1, in particular in FIG. 1 of that publication and in the corresponding portions of the description.

Figure 9:
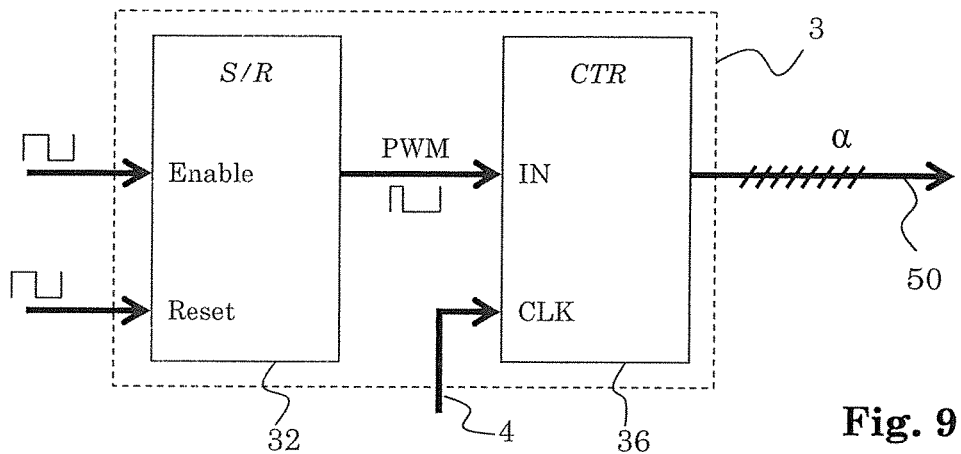
FIG. 9 a block-diagrammatical illustration of an unambiguous phase detecting circuit.

FIG. 9 is a schematic block-diagrammatical illustration of an unambiguous phase detecting circuit 3 as it may be used in a sensor according to FIG. 8 or according to another described embodiment.

Unambiguous phase detecting circuit 3 includes a latch 32, in particular a set-reset latch 32 and a counter 36. Logic periodic signals, such as, e.g., processed magnetic signals 6 outputted from signal processing unit 2 and reference signals 7 outputted from control unit L, are inputted to the two inputs of latch 8, e.g., processed magnetic signals 6 are inputted to a set (or enable) input of latch 8, so as to trigger the on-state (or high state), and reference signals 7 are inputted to a reset input of latch 8, so as to trigger the off-state (or idle state), or vice versa. Both inputted logic periodic signals have the same frequency f0, but their relative phase depends on (and may even represent) the sought angle α. As a result, a PWM (pulse wave modulation) signal having a duty cycle representative of the relative phase of the two inputted logic periodic signals and thus representative of the sought angle α is outputted. The PWM signal outputted by latch 8 is fed into counter 36, which in addition is provided with the clock signal 4 (cf., e.g., FIG. 1) having usually a much higher frequency, e.g., three orders of magnitude higher than the before-mentioned PWM signal, depending on the desired resolution. Counter 36 outputs output angle signals 50, e.g., like sketched in FIG. 10, an eight-bit digital signal representative of the sought angle α. Alternatively, other unambiguous phase detection principles and implementations may be used.

Figure 10:
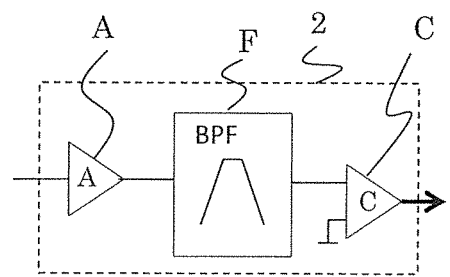
FIG. 10 a block-diagrammatical illustration of a signal processing unit.

FIG. 10 is a block-diagrammatical illustration of a signal processing unit 2—which due to the identical construction of signal processing units 2 and 2' may represent an example for a signal processing unit 2' as well. The signal processing unit 2 illustrated in FIG. 10 may be used in a sensor 100 according to FIG. 8 or according to another described embodiment. It includes an amplifier A, a filtering-or-resonating unit F, such as a band pass filter, and a comparator. The filtered signals outputted by filtering-or-resonating unit F are fed into one input of a comparator C, the other input of comparator C being connected to ground potential.

Filtering-or-resonating unit F usually is tuned at least approximately to frequency f0 so as to extract from inputted signals including a frequency component of frequency f0 a signal of frequency f0, e.g., by suppressing other frequency components contained in the inputted signals, e.g., producing a sine-shaped signal.

Any one of the above-described embodiments may in particular be constructed such that
the signals 4 are logic periodic signals of frequency fc;
the signals 5, 5*\* are analog periodic signals of frequency f0;
the signals 6, 6', 6\* are logic signals, in particular logic periodic signals of frequency f0;
the signals 7, 7' are logic signals, in particular logic periodic signals of frequency f0;
the signals 8, 8' are digital signals;
the signals 50 are digital signals.

An attenuator such as the attenuators 13 described in conjunction with the Figures and embodiments above may be realized, e.g., as a voltage divider with resistors, or another voltage divider which introduces no (or negligible) phase shift.

A sensor according to the invention can be particularly fast, in particular when signal forming is carried out in one of the described ways.

The invention claimed is:

1. A sensor for sensing an angular orientation of a magnet producing a magnetic field, said sensor comprising a sensing unit, comprising:
   N≥2 magnetic field sensing devices;
   a scanning circuit for repeatedly, at a frequency f0, sequentially probing in a first preset order at least two of said N magnetic field sensing devices and concatenating signals outputted by the respective probed magnetic field sensing devices in reaction to said magnetic field for obtaining a first raw magnetic signal, which is an analog signal comprising a frequency component of said frequency f0;
   at least a first magnet-signal output for outputting said first raw magnetic signal; and
   a reference output for outputting a reference signal, which is a logic signal of said frequency f0 that is independent of said magnetic field;
the sensor furthermore comprising
   a first signal processing unit and a second signal processing unit which are identically constructed, each having an input and an output;
   a phase detection unit having at least first and second inputs, for deriving phase differences between signals inputted to the phase detection unit, and for obtaining in dependence of said phase differences, and for outputting an output angle signal representative of an angle related to said angular orientation, said phase detection unit comprising a first unambiguous-phase detecting circuit having two inputs that are identical to said first and second inputs, respectively; of said phase detection unit;
wherein
   said input of said first signal processing unit is coupled to said first magnet-signal output;
   said output of said first signal processing unit is coupled to said first input of said phase detection unit;
   said reference output is coupled to said second input of said phase detection unit;
   said input of said second signal processing unit is coupled to an output of said sensing unit;
   said output of said second signal processing unit is coupled to an input of said phase detection unit.

2. The sensor according to claim 1, wherein
   said phase detection unit comprises a third an a fourth input;
   said phase detection unit comprises a second unambiguous phase detecting circuit having two inputs that are identical to said third and fourth input, respectively, of said phase detection unit; and
   said output of said second signal processing unit is coupled to said third input of said phase detection unit.

3. The sensor according to claim 2, wherein said phase detection unit comprises an adder or subtractor having a first input and a second input, said first and second unambiguous phase detecting circuits each having an output for outputting a phase difference signal, wherein
   said output of said first unambiguous phase detecting circuit is coupled to said first input of said digital adder or subtractor; and said output of said second unambiguous phase detecting circuit is coupled to said second input of said digital adder or subtractor.

4. The sensor according to claim 3, wherein
said reference output or said output of said first signal processing unit is coupled to said fourth input of said phase detection unit and to said input of said second signal processing unit.

5. The sensor according to claim 3, wherein said scanning circuit is furthermore structured and configured for repeatedly, at said frequency f0, sequentially probing in a second preset order at least two of said N magnetic field sensing devices and concatenating signals outputted by the respective probed magnetic field sensing devices in reaction to said magnetic field for obtaining a second raw magnetic signal, which is an analog signal comprising a frequency component of said frequency f0, and wherein the sensing unit comprises a second magnet-signal output for outputting said second raw magnetic signal, and wherein
said second magnet-signal output is coupled to said input of the second signal processing unit; and
said reference output is coupled to said fourth input of said phase detection unit.

6. The sensor according to claim 2, wherein said sensing unit comprises an input, and wherein said phase detection circuit comprises an integrating unit for producing and outputting a control signal at its output, said integrating unit comprising an integrator, and wherein an output of said second unambiguous phase detecting circuit is coupled to an input of said integrating unit.

7. The sensor according to claim 6, wherein said sensor comprises a clock generator for generating and outputting at its output a clock signal of a frequency fc, said clock generator having a control input for setting said frequency fc, said input of said sensing unit being coupled to said output of said clock generator, and wherein said output of said integrating unit is coupled to said control input of said clock generator.

8. The sensor according to claim 6, wherein
said reference output or said output of said first signal processing unit is coupled to said fourth input of said phase detection unit and to said input of said second signal processing unit.

9. The sensor according to claim 1, wherein
said reference output is coupled to said input of said second signal processing unit; and
said output of said second signal processing unit is coupled to said second input of said phase detection unit.

10. The sensor according to claim 1, wherein said first signal processing unit comprises at least one of a filter, an amplifier, and a comparator.

11. The sensor according to claim 1, wherein said probing at least two of said N magnetic field sensing devices in said first preset order is carried out such that repeatedly,
different vectorial components of said magnetic field in a sensing plane are probed; or
in different locations in said sensing plane, the respective vectorial component of said magnetic field perpendicular to said sensing plane is probed.

12. An integrated circuit comprising the sensor according to claim 1.

13. A device or arrangement, comprising the sensor according to claim 1 or the integrated circuit according to claim 12.

14. The device or arrangement according to claim 13, the device or arrangement being at least one of:

an angular position sensor;
a rotary encoder;
a rotation speed sensor;
a revolution counter;
an electric motor.

15. The sensor according to claim 7, wherein
said reference output or said output of said first signal processing unit is coupled to said fourth input of said phase detection unit and to said input of said second signal processing unit.

16. A method for sensing an angular orientation of a magnet producing a magnetic field, said method comprising
providing a sensing unit comprising N≥2 magnetic field sensing devices;
repeatedly, at a frequency f0, sequentially probing in a first preset order at least two of said N magnetic field sensing devices;
concatenating signals outputted by the respective probed magnetic field sensing devices in reaction to said magnetic field for obtaining a first raw magnetic signal, said first raw magnetic signal being an analog signal comprising a frequency component of said frequency f0;
outputting said first raw magnetic signal; and
outputting a reference signal, which is a logic signal of said frequency f0 that is independent of said magnetic field;
providing a first signal processing unit and a second signal processing unit, which are identically constructed, each having an input and an output;
providing a phase detection unit having at least first and second inputs, for deriving phase differences and for obtaining in dependence of said phase differences and for outputting an output angle signal representative of an angle related to said angular orientation, said phase detection unit comprising at least a first unambiguous phase detecting circuit having two inputs that are identical to said first and second inputs, respectively, of the phase detection unit;
the method further comprising
processing said first magnetic signals in said first signal processing unit for obtaining a first processed magnetic signals;
feeding said first processed magnetic signals to said first input of said phase detection unit;
providing an interconnection between said reference output and said second input of said phase detection unit;
providing an interconnection between said input of said second signal processing unit and an output of said sensing unit;
providing an interconnection between said output of said second signal processing unit and an input of said phase detection unit.

17. A method comprising carrying out a method according to claim 16, wherein the method is a method for at least one of
determining an angular position of a rotatable body comprising said magnet;
determining a rotational speed of a rotating body comprising said magnet;
determining a change in rotational speed of a rotating body comprising said magnet;
determining a number of revolutions of a rotatable body that have taken place from an initial point in time.

18. A method for manufacturing a sensor for sensing an angular orientation of a magnet producing a magnetic field, said method comprising manufacturing in a single piece of semiconductor material a sensing unit comprising
- N≥2 magnetic field sensing devices;
  - a scanning circuit for repeatedly, at a frequency f0, sequentially probing in a first preset order at least two of said N magnetic field sensing devices and concatenating signals outputted by the respective probed magnetic field sensing devices in reaction to said magnetic field for obtaining a first raw magnetic signal, which is an analog signal comprising a frequency component of said frequency f0;
  - at least a first magnet-signal output for outputting said first raw magnetic signal; and
  - a reference output for outputting a reference signal, which is a logic signal of said frequency f0 that is independent of said magnetic field;

the sensor furthermore comprising
- a first signal processing unit and a second signal processing unit which are identically constructed, each having an input and an output;
- a phase detection unit having at least first and second inputs, for deriving phase differences between signals inputted to the phase detection unit and for obtaining in dependence of said phase differences and for outputting an output angle signal representative of an angle related to said angular orientation, said phase detection unit comprising at least a first unambiguous phase detecting circuit having two inputs that are identical to said first and second input, respectively, of the phase detection unit;

wherein
- said input of said first signal processing unit is coupled to said first magnet-signal output;
- said output of said first signal processing unit is coupled to said first input of said phase detection unit;
- said reference output is coupled to said second input of said phase detection unit;
- said input of said second signal processing unit is coupled to an output of said sensing unit;
- said output of said second signal processing unit is coupled to an input of said phase detection unit.

* * * * *